(12) United States Patent
Ogasa et al.

(10) Patent No.: US 11,876,184 B2
(45) Date of Patent: Jan. 16, 2024

(54) ELECTROLYTE MEDIUM FOR LITHIUM SECONDARY BATTERY AND LITHIUM SECONDARY BATTERY

(71) Applicants: HONDA MOTOR CO., LTD., Tokyo (JP); SAITAMA PREFECTURE, Saitama (JP)

(72) Inventors: Hiroshi Ogasa, Saitama (JP); Hideki Kurihara, Saitama (JP); Masashi Inamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 16 days.

(21) Appl. No.: 17/447,932

(22) Filed: Sep. 17, 2021

(65) Prior Publication Data
US 2022/0085415 A1 Mar. 17, 2022

(30) Foreign Application Priority Data
Sep. 17, 2020 (JP) ................. 2020-156005

(51) Int. Cl.
*H01M 10/056* (2010.01)
*H01M 10/0568* (2010.01)
(Continued)

(52) U.S. Cl.
CPC ....... *H01M 10/0568* (2013.01); *H01M 4/134* (2013.01); *H01M 4/382* (2013.01);
(Continued)

(58) Field of Classification Search
CPC .......... H01M 10/0568; H01M 10/052; H01M 10/0525; H01M 10/0569; H01M 50/44;
(Continued)

(56) References Cited

U.S. PATENT DOCUMENTS

2006/0263693 A1 11/2006 Kim et al.
2019/0058185 A1 2/2019 Lee et al.
(Continued)

FOREIGN PATENT DOCUMENTS

CN 105406123 A 3/2016
CN 105938919 A 9/2016
(Continued)

OTHER PUBLICATIONS

Machine-generated translation of CN 107017434, Xie et al., "Non-aqueous Electrolyte and Lithium Ion Secondary Battery", Jun. 11, 2019.*
Office Action issued in the CN Patent Application No. CN202111095470.7, dated Nov. 23, 2023.

*Primary Examiner* — Raymond Alejandro
(74) *Attorney, Agent, or Firm* — CKC & PARTNERS CO., LLC

(57) ABSTRACT

To provide a lithium secondary battery capable of suppressing short circuits and having high energy density and high output. An electrolyte medium for a lithium secondary battery includes a low dielectric constant solvent, a lithium salt, and a polyvalent cation salt. The polyvalent cation salt is dispersed as particles in the electrolyte medium and can flow without being immobilized. The electrolyte medium includes 20 mass % or less of a high dielectric constant solvent. A lithium secondary battery including the electrolyte medium for a lithium secondary battery can suppress short circuits and provide high energy density and high output.

7 Claims, 14 Drawing Sheets

(51) Int. Cl.
  *H01M 10/052* (2010.01)
  *H01M 4/134* (2010.01)
  *H01M 50/44* (2021.01)
  *H01M 10/0569* (2010.01)
  *H01M 4/38* (2006.01)
  *H01M 4/02* (2006.01)

(52) U.S. Cl.
  CPC ..... *H01M 10/052* (2013.01); *H01M 10/0569* (2013.01); *H01M 50/44* (2021.01); *H01M 2004/027* (2013.01); *H01M 2300/0028* (2013.01)

(58) Field of Classification Search
  CPC .............. H01M 4/134; H01M 4/382; H01M 2004/027; H01M 2300/0028
  See application file for complete search history.

(56) References Cited

U.S. PATENT DOCUMENTS

| | | |
|---|---|---|
| 2019/0214622 A1 | 7/2019 | Choi et al. |
| 2019/0372118 A1 | 12/2019 | Woo et al. |
| 2020/0136128 A1 | 4/2020 | Woo et al. |

FOREIGN PATENT DOCUMENTS

| | | | | |
|---|---|---|---|---|
| CN | 107017434 | * | 6/2019 | ........ H01M 10/0567 |
| CN | 110600797 A | | 12/2019 | |
| JP | 2001229967 A | | 8/2001 | |
| JP | 2006310302 A | | 11/2006 | |
| JP | 2008288112 A | | 11/2008 | |
| JP | 2019121610 A | | 7/2019 | |
| KR | 20190143566 A | | 12/2019 | |
| WO | 2018034526 A1 | | 2/2018 | |
| WO | 2019031732 A1 | | 2/2019 | |
| WO | 2019031766 A2 | | 2/2019 | |

* cited by examiner

MgO NOT ADDED 0.05wt% MgO ADDED 0.15wt% MgO ADDED

ELECTROLYTE MEDIUM FOR LITHIUM SECONDARY BATTERY AND LITHIUM SECONDARY BATTERY

This application is based on and claims the benefit of priority from Japanese Patent Application No. 2020-156005, filed on 17 Sep. 2020, the content of which is incorporated herein by reference.

BACKGROUND OF THE INVENTION

Field of the Invention

The present invention relates to an electrolyte medium for a lithium secondary battery and a lithium secondary battery.

Related Art

It is conventionally known that, in a lithium secondary battery using a redox reaction of lithium, lithium precipitates in dendrite form, and thus a short circuit between the positive electrode and the negative electrode occurs. For this reason, for example, in a lithium ion secondary battery, this short circuit is suppressed by using a graphite negative electrode and a microporous sheet separator where lithium ions are inserted and desorbed, whereby the battery is put to practical use. However, in recent years, storage batteries for automobiles and drones are required to have higher, energy density and higher output, than this lithium ion secondary battery.

Therefore, to achieve high energy density, the use of lithium metal, which is a material with the highest energy density, has been studied. However, it is known that, in the case of using this lithium metal, lithium precipitates in dendrite form during charging, and thus it is known that a partial short circuit, depletion of electrolytic solution, dropout of precipitated lithium, or the like causes significant cycle degradation. Further, in high-rate and large batteries, short circuits or the like occur, and safety is an issue. Therefore, lithium metal secondary batteries are not generally used.

Here, for example, to prevent lithium from precipitating in dendrite form, coating and alloying of lithium metal have been studied (for example, see Patent Document 1). Further, it has been reported that a stable layer is formed on lithium metal by complexation with an inorganic substance such as magnesium oxide or alloying with magnesium or the like (see Patent Documents 2 to 5). However, since lithium metal is extremely active, it may be altered during the coating process and may be oxidized during alloy production. Further, if a portion of the coating is missing, there is a possibility that lithium may grow a dendrite therefrom. Therefore, the process of coating lithium metal and the process of forming an alloy of lithium metal are not easy. In particular, polyvalent ions such as magnesium react with a high dielectric constant solvent to inactivate (decrease in ion permeability), so that the battery reaction is inhibited.

To increase output, the use of a nonwoven fabric separator having a high porosity has been studied. The microporous sheet separator usually used in lithium ion batteries has characteristics suitable for lithium ion batteries, such as short circuit prevention, chemical resistance, and mechanical strength, but the porosity is 50% or less. In contrast, in a nonwoven fabric separator, the porosity can be increased to about 90%, and thus high output of the lithium secondary battery can be expected. However, if the porosity is high, a slight short circuit will occur, and cycle stability and safety will become an issue. That is, there is a trade-off between high output and short circuit suppression, and when a lithium ion battery is actually constructed using a nonwoven fabric separator having a porosity of 78%, for example, significant cycle degradation is caused. In particular, it is assumed that a nonwoven fabric separator is not suitable for a lithium metal secondary battery that is prone to a short circuit. Therefore, lithium secondary batteries using nonwoven fabric separators have not been put into practical use at present.

Patent Document 1: PCT International Publication No. WO2018/034326
Patent Document 2: PCT International Publication No. WO2019/031732
Patent Document 3: PCT International Publication No. WO2019/031766
Patent Document 4: Japanese Unexamined Patent Application, Publication No. 2019-121610
Patent Document 5: Japanese Unexamined Patent Application, Publication No. 2006-310302

SUMMARY OF THE INVENTION

Therefore, there is a need for a lithium secondary battery capable of suppressing short circuits and having high energy density and high output.

The present invention has been made in response to the above issue, and an object of the present invention is to provide a lithium secondary battery capable of suppressing short circuits and having high energy density and high output.

A first aspect of the present invention provides an electrolyte medium for a lithium secondary battery. The electrolyte medium includes a low dielectric constant solvent a lithium salt, and a polyvalent cation salt. The polyvalent cation salt is dispersed as particles in the electrolyte medium and the particles can flow without being immobilized. The electrolyte medium does not include a high dielectric constant solvent or includes 20 mass % or less of the high dielectric constant solvent.

In a second aspect of the present invention according to the first aspect, the polyvalent cation salt may be at least one selected from the group consisting of magnesium trifluoromethanesulfonate, magnesium oxide, magnesium bis(trifluoromethanesulfonyl) imide, calcium trifluoromethanesulfonate, calcium oxide, calcium bis(trifluoromethanesulfonyl)imide, aluminum trifluoromethanesulfonate, and aluminum oxide.

In a third aspect of the present invention according to the first aspect or the second aspect, a content of the polyvalent cation salt may be 0.1 mass % to 50 mass %.

In a fourth aspect of the present invention according to any one of the first aspect to the third aspect, a particle diameter of the polyvalent cation salt may be 100 μm or less.

In a fifth aspect of the present invention according to any one of the first aspect to the fourth aspect, the electrolyte medium for a lithium secondary battery may include a thickener.

A sixth aspect of the present invention provides a lithium secondary battery including the electrolyte medium for a lithium secondary battery according to any one of the first aspect to the fifth aspect.

In a seventh aspect of the present invention according to the sixth aspect, the lithium secondary battery may include a separator made of a nonwoven fabric.

In an eighth aspect of the present invention according to the sixth or the seventh aspect, the lithium secondary battery may include a negative electrode composed of lithium metal or a lithium metal alloy.

According to the present invention, it is possible to provide the lithium secondary battery capable of suppressing short circuits and having high energy density and high output.

DETAILED DESCRIPTION OF THE INVENTION

Figure 1:
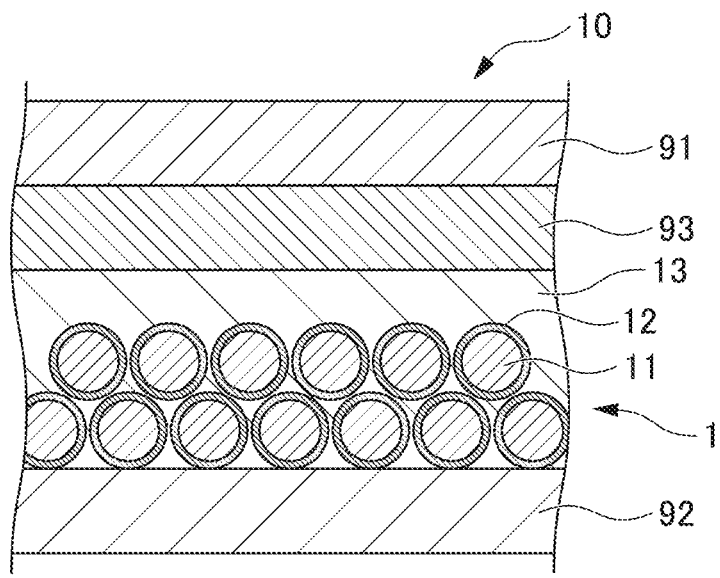
FIG. 1 is a cross-sectional view schematically showing a first configuration of a lithium secondary battery using an electrolyte medium according to an embodiment of the present invention.

An embodiment of the present invention will now be described in detail with reference to the drawings.
(Electrolyte Medium for Lithium Secondary Battery)

An electrolyte medium for a lithium secondary battery according to an embodiment of the present invention (hereinafter, also simply referred to as an electrolyte medium) is used in a lithium secondary battery, and includes a low dielectric constant solvent, a lithium salt, and a polyvalent cation salt in a state in which particles of the polyvalent cation salt are dispersed (undissolved state) and can flow without being immobilized. Further, the electrolyte medium according to the present embodiment is characterized in that the content of a high dielectric constant solvent having a higher dielectric constant than that of the low dielectric constant solvent is 20 mass % or less. The electrolyte medium according to the present embodiment having such a configuration allows a lithium secondary battery capable of suppressing short circuits and having high energy density and high output, to be provided.

Further, by including the electrolyte medium according to the embodiment of the present invention, since the particles of the polyvalent cation salt are present on the negative electrode (lithium metal) in a flowing state, a solid electrolyte interphase (SEI) layer having a bulky structure is formed at an interface between the negative electrode and the electrolyte medium, and a short circuit is suppressed. Thus, in a lithium secondary battery provided with the electrolyte medium according to the present embodiment, a lithium metal negative electrode and a nonwoven fabric separator can be used, and a lithium secondary battery with high energy density and high output can be provided.

In the present embodiment, the low dielectric constant solvent means a solvent having a dielectric constant of less than 10. The electrolyte medium according to the present embodiment mainly includes this low dielectric constant solvent.

The high dielectric constant solvent means a solvent having a dielectric constant of greater than 50. In the electrolyte medium according to the present embodiment, the content of this high dielectric constant solvent is 20 mass % or less. More preferably, the content of the high dielectric constant solvent is 10 mass % or less, further preferably, 0 mass %, i.e., it is preferable not to include the high dielectric constant solvent. This is because the high dielectric constant solvent is passivated by reacting with the polyvalent cation salt, and diffusion of lithium ions is inhibited.

As the low dielectric constant solvent, a chain carbonate can be used. As the chain carbonate, for example, dimethyl carbonate (DMC), ethyl methyl carbonate (EMC), or diethyl carbonate (DEC) can be used.

As the high dielectric constant solvent, a cyclic carbonate can be used. As the cyclic carbonate, for example, ethylene carbonate (EC) or propylene carbonate (PC) can be used.

As the lithium salt, a conventionally known lithium salt that can be used in a lithium secondary battery can be used. Specifically, for example, a lithium salt such as lithium hexafluorophosphace: $LiPF_6$, lithium tetrafluoroborate: $LiBF_4$, or lithium bis(fiuorosulfonyl)imide:LiFSI can be used.

As the polyvalent cation salt, a polyvalent metal salt is preferably used, and a divalent or trivalent metal salt is more preferably used. Among them, a magnesium salt, a calcium salt, or an aluminum salt is further preferably used. These polyvalent cation salts can be used regardless of the type of anion.

As the magnesium salt, for example, magnesium trifluoromethanesulfonate $(Mg(TFS)_2):(Mg(SO_3CF_3)_2$, magnesium oxide:(MgO), or magnesium bis (trifluoromethanesulfonyl) imide $(MgTFSI_2):Mg[N(SO_2CF_3)_2]_2$ can be used.

As the calcium salt, for example, calcium trifluoromethanesulfonate $(Ca(TFS)_2):(Ca(SO_3CF_3)_2$, calcium oxide (CaO), or calcium bis(trifluoromethanesulfonyl)imide (Ca $(TFSI)_2):Ca[N(SO_2CF_3)_2]_2$ can be used.

As the aluminum salt, for example, aluminum trifluoromethanesulfonate $(Al(TFS)_3):Al(SO_3CF_3)_3$ or aluminum oxide $(Al_2O_3)$ can be used.

As described above, the electrolyte medium for a lithium secondary battery according to the present embodiment can use as the polyvalent cation salt, at least one selected from the group consisting of magnesium trifluoromethanesulfonate, magnesium oxide, magnesium bis(trifluoromethanesulfonyl)imide, calcium trifluoromethanesulfonate, calcium oxide, calcium bis(trifluoromethanesulfonyl)imide, aluminum trifluoromethanesulfonate, and aluminum oxide. In other words, the electrolyte medium for a lithium secondary battery according to the present embodiment may use one of these polyvalent cation salts alone, or a plurality of the polyvalent cation salts in combination.

In the present embodiment, the polyvalent cation salt is dispersed as particles in the electrolyte medium and the particles can flow without being immobilized. The polyvalent cation salt may be in either a colloidal state or a suspended state in a liquid phase, or a solid phase state. Further, the polyvalent, cation salt may be in the form of colloids or particles in a liquid phase due to the anion of the lithium salt described above, or in a solid phase state due to the thickener described above. Accordingly, since the polyvalent cation salt is present on the negative electrode in a flowing state, an SEI layer having a bulky structure can be formed at an interface between the negative electrode and the electrolyte medium, and thus a short circuit can be suppressed.

The inclusion state of the polyvalent cation salt of the present embodiment, i.e., "a state in which particles are dispersed and can flow without being immobilized" will be described in detail with reference to FIGS. 1 to 4.

FIG. 1 is a cross-sectional view schematically showing a first configuration of a lithium secondary battery using the electrolyte medium according to the embodiment of the present invention. As shown in FIG. 1, in a lithium secondary battery 10 having the first configuration, a separator 93 is disposed near a positive electrode 91, and an electrolyte medium 1 is disposed near a negative electrode 92, between the positive electrode 91 and the negative electrode 92. In the electrolyte medium 1, polyvalent cation salt particles 11 each having a surface coated with an electrolytic solution layer 12 are dispersed and disposed near the negative electrode 92, and flow without being immobilized on the surface of the negative electrode 92.

Figure 2:
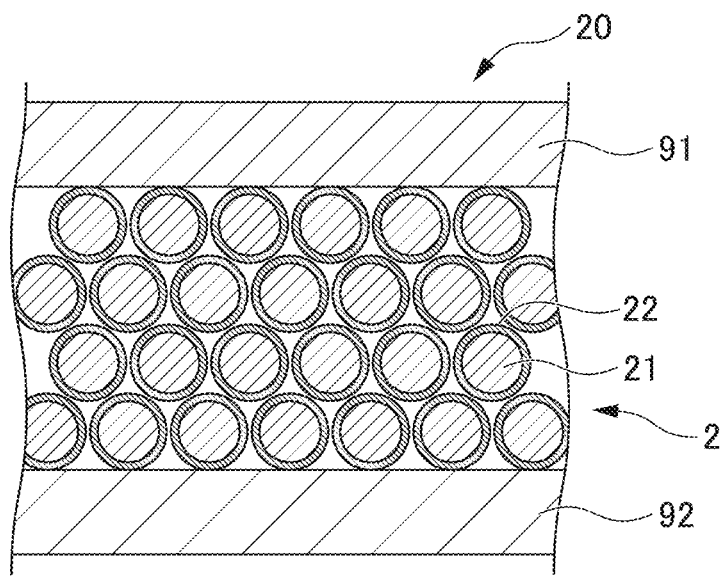
FIG. 2 is a cross-sectional view schematically showing a second configuration of a lithium secondary battery using an electrolyte medium according to an embodiment of the present invention.

FIG. 2 is a cross-sectional view schematically showing a second configuration of a lithium secondary battery using an electrolyte medium according to an embodiment of the present invention. As shown in FIG. 2, in the lithium secondary battery 20 having the second configuration, an electrolyte medium 2 ia disposed between a positive electrode 01 and a negative electrode 92. In the electrolyte medium 2, polyvalent cation salt particles 21 each having a surface coated with an electrolytic solution layer 22 are uniformly dispersed and disposed, and flow without being immobilized on the surface of the negative electrode 92.

Figure 3:
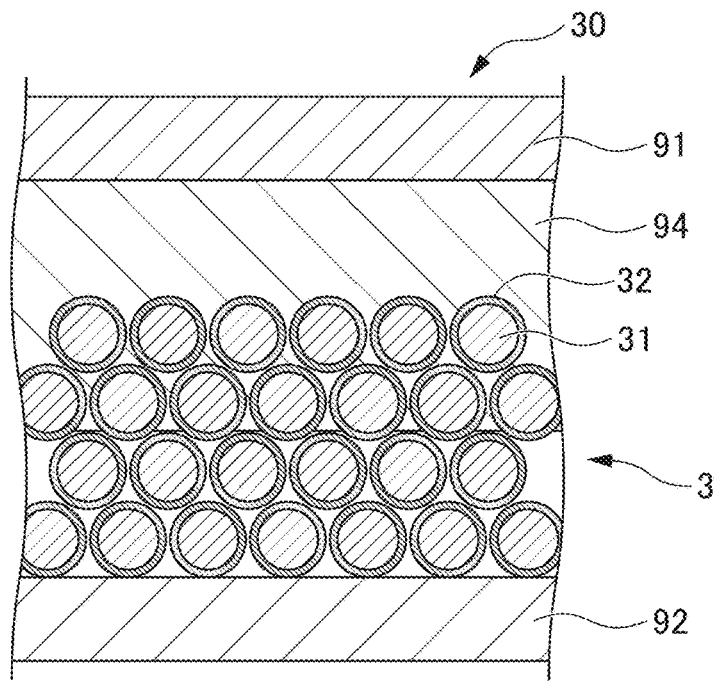
FIG. 3 is a cross-sectional view schematically showing a third configuration of a lithium secondary battery using an electrolyte medium according to an embodiment of the present invention.

FIG. 3 is a cross-sectional view schematically showing a third configuration of a lithium secondary battery using an electrolyte medium according to an embodiment of the present invention. As shown in FIG. 3, in a lithium secondary battery 30 having the third configuration, a solid electrolyte 94 is disposed near a positive electrode 91, and an electrolyte medium 3 is disposed near a negative electrode 92, between the positive electrode 91 and the negative electrode 92. In the electrolyte medium 3, polyvalent cation salt particles 31 each having a surface coated with an electrolytic solution layer 32 are dispersed and disposed near the negative electrode 92, and flow without being immobilized on the surface of the negative electrode 92. Further, some of the polyvalent cation salt particles 31 each having the surface coated with the electrolytic solution layer 32 are mixed with the solid electrolyte 94.

Figure 4:
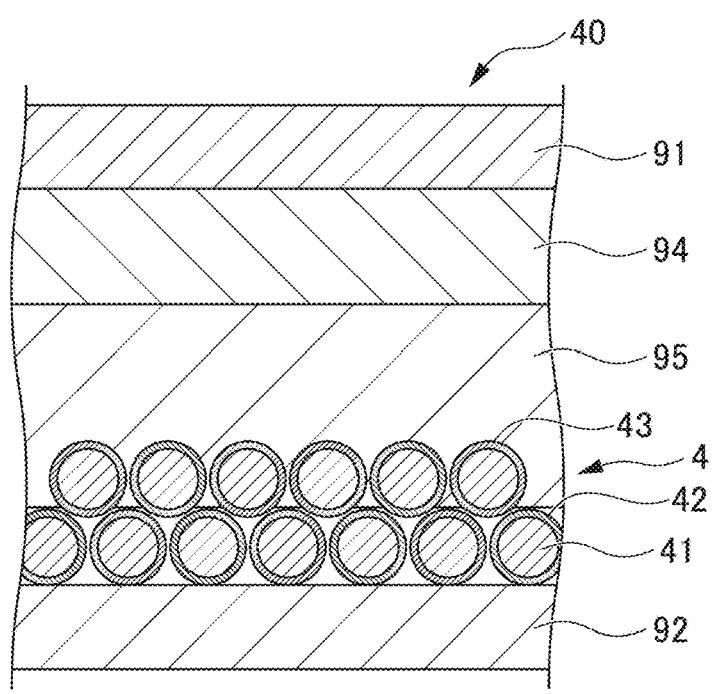
FIG. 4 is a cross-sectional view schematically showing a fourth configuration of a lithium secondary battery using an electrolyte medium according to an embodiment of the present invention.

FIG. 4 is a cross-sectional view schematically showing a fourth configuration of a lithium secondary battery using an electrolyte medium according to an embodiment of the present invention. As shown in FIG. 4, in a lithium secondary battery 40 having the fourth configuration, a solid electrolyte 94 and an electrolyte gel 95 are disposed in order from nearest to furthest from a positive electrode 91, and an electrolyte medium 4 is disposed near a negative electrode 92, between the positive electrode 91 and the negative electrode 92. In the electrolyte medium 4, polyvalent cation salt particles 41 each having a surface coated with an electrolytic solution layer 42 and polyvalent cation salt particles 41 each having a surface coated with an electrolyte gel layer 43 are dispersed and disposed near the negative electrode 92, and flow without being immobilized on the surface of the negative electrode 92. Some of the polyvalent cation salt particles 41 each having the surface coated with the electrolytic solution layer 42 and some of the polyvalent cation salt particles 41 each having the surface coated with the electrolyte gel layer 43 are mixed with the electrolyte gel 95.

The inclusion state of the polyvalent cation salt in the first to fourth configurations described above means "a state in which particles are dispersed and can flow without being immobilized". As described above, it is presumed that the particles of the polyvalent cation salt flow without being immobilized and thereby adsorb the electrolytic solution, resulting in a concentrated electrolyte solution in the vicinity of the particles of the polyvalent cation salt, which can suppress a short circuit. Each of the inclusion states of the polyvalent cation salts in the first to fourth configurations can be realized by mixing the low dielectric constant solvent, the high dielectric constant solvent as needed, the lithium salt, and the polyvalent cation salt described above to form the electrolyte medium.

Figure 5:
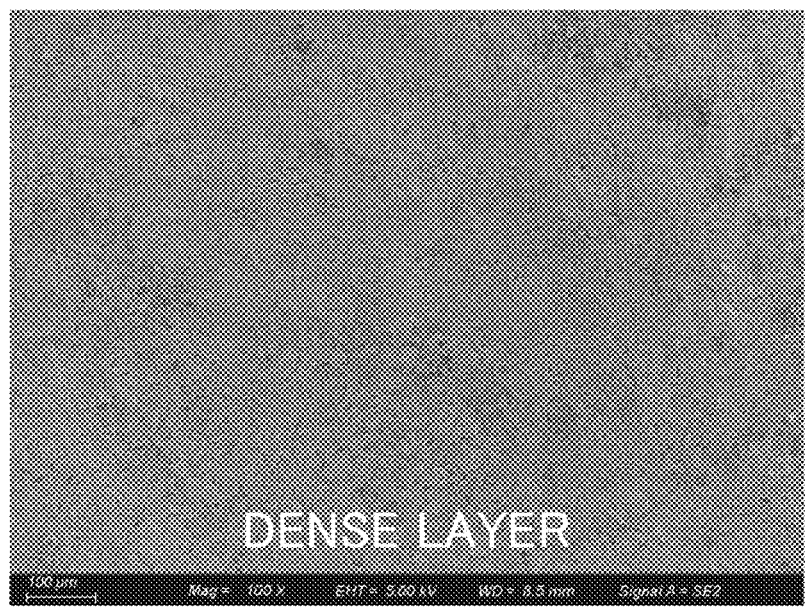
FIG. 5 is a scanning electron microscope (SEM) image of a solid electrolyte interphase (SEI) layer in a lithium secondary battery using a conventional electrolyte medium without a polyvalent cation salt.

FIG. 5 is a scanning electron microscope (SEM) image of a solid electrolyte interphase (SEI) layer in a lithium secondary battery using a conventional, electrolyte medium without a polyvalent cation salt. More particularly, FIG. 5 shows that the surface of an SEI layer formed on a negative electrode of a conventional lithium secondary battery including an electrolyte medium without a polyvalent cation salt (MgO) was observed using an SEM (the same applies to FIGS. 6 ana 7 described later). As shown in FIG. 5, it can be seen that when the electrolyte medium without a polyvalent cation salt (MgO) is used, an SEI layer having a dense structure is formed on the negative electrode.

Figure 6:
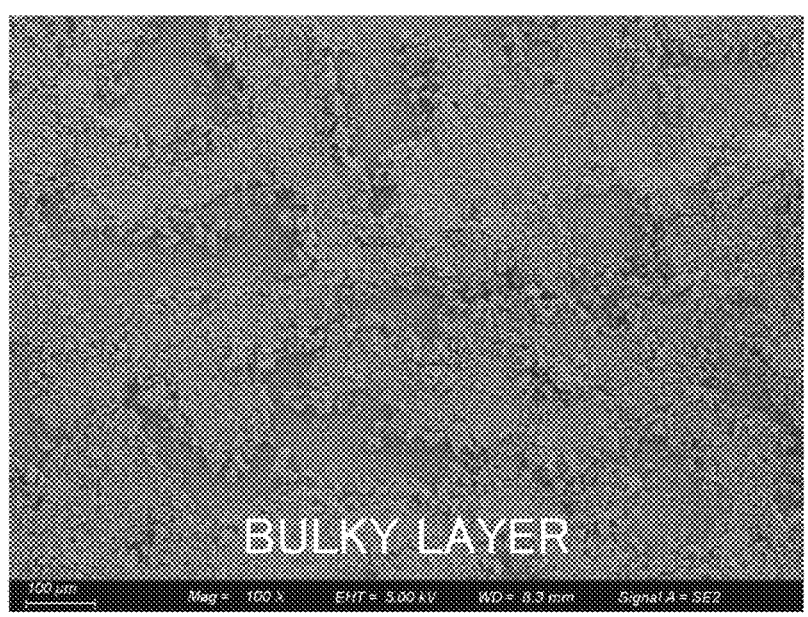
FIG. 6 is an SEM image of an SEI layer in a lithium secondary battery using an electrolyte medium according to an embodiment of the present invention with 0.05 mass % of a polyvalent cation salt.

In contrast, FIG. 6 shows an SEM image of an SET layer in a lithium secondary battery using an electrolyte medium according to an embodiment of the present invention with 0.05 mass % of a polyvalent cation salt. As shown in FIG. 6, it can be seen that a bulky SET layer is formed on a negative electrode/ although it is not complete because the amount of the polyvalent cation salt added is as small as 0.05 mass %. FIG. 1 shows an SEM image of an SEI layer in a lithium, secondary battery using an electrolyte medium according to an embodiment of the present invention with 0.15 mass % of a polyvalent cation salt. As shown in FIG. 1, it can be seen that the addition of 0.15 mass % of the polyvalent cation salt is sufficient to form a complete bulky SEI layer on a negative electrode.

Figure 7:
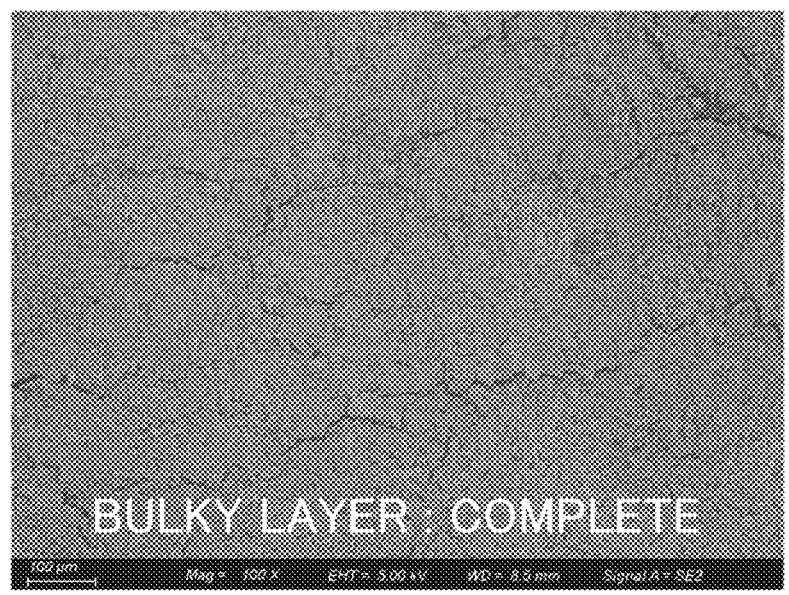
FIG. 7 is an SEM image of an SEI layer in a lithium secondary battery using an electrolyte medium according to an embodiment of the present invention with 0.15 mass % of a polyvalent cation salt.

When an SEI layer having a bulky structure is formed on a negative electrode in this manner, it is considered that the movement of ions is deiocaiized (randomized) and thus a short circuit can be suppressed without preventing a short circuit by a separator. Therefore, the formation of a bulky SEI layer as shown in FIGS. 6 and 7 enables stable cycle characteristics to be obtained. The SEI layer itself is considered to be composed of LiF, COx, or the like, similarly to an SEI layer conventionally known.

Among the above-described polyvalent cation salts, magnesium trirluoromethanesulfonate ($Mg(TFS)_2$) has a characteristic of being dissolved in an electrolyte medium by heating. Magnesium bis (trifluoromethanesulfonlyl)imide ($MgTFSI_2$) is dissolved in DMC at 25° C., and magnesium trifluoromethanesulfonate ($Mg(TFS)_2$) becomes colloidal, and these disperse in a particulate form as $(MgPF_6)_2$ when left to stand.

The average particle diameter of the polyvalent cation salt is preferably 100 μm or less. When the average particle diameter of the polyvalent cation salt is 100 μm or less, a short circuit can be suppressed more reliably, and high energy density and high output can be obtained more reliably. When the average particle diameter of the polyvalent cation salt is large, variation in capacity between cycles tends to be large, so that a more preferred average particle diameter of the polyvalent cation salt is 20 μm or less.

The content of the polyvalent cation salt is preferably 0.1 mass % to 50 mass %. If the content of the polyvalent cation salt is within this range, the negative electrode is covered with a bulky SEI layer, thus obtaining stable charge and discharge characteristics. The high content of the polyvalent cation salt causes the electrolyte medium to become a granular solid and thus can avoid the degradation of rate characteristics. A more preferred content of the polyvalent cation salt is 0.1 mass % to 1.5 mass %.

The electrolyte medium according to the present embodiment may include other components such as an additive within a range that does not hinder the effect of the present embodiment.

The electrolyte medium according to the present embodiment may include a thickener. The addition of a thickener to the electrolyte medium according to the present embodiment described above allows a polyvalent cation salt particle layer to be stably formed.

As the thickener (when the concentration of a thickener is increased, the thickener gels, and in this case, it is also referred to as a gelling agent), for example, carboxy methylcellulose (CMC), polyethylene oxide (PEO), and polyvinylidene fluoride (PVdF) can be used.

The electrolyte medium according to the present embodiment has, for example, a viscosity of 5000 mPa·s or more by adding the above-described thickener. If the viscosity is 5000 mPa·s or more, the handleability at the time of production is improved.

The electrolyte medium according to the present embodiment including a thickener can be preferably used in solid-state batteries. For example, a solid-state battery can be constructed by disposing the electrolyte medium according to the present embodiment at the interface of the negative electrode and using it as a solid electrolyte layer.

The electrolyte medium according to the present embodiment including a thickener can be used in a solid-state battery in which the negative electrode is made anodeiess and lithium metal is electrochemically generated on a copper foil or the like. This is because a solid electrolyte layer used in a solid-state battery includes a larger amount of lithium salt than a liquid electrolyte used in a conventional lithium ion secondary battery, and is therefore suitable for the generation of lithium metal.

[Lithium Secondary Battery]

The lithium secondary battery according to the present embodiment includes the electrolyte medium according to the present embodiment described above. Specifically, the lithium secondary battery according to the present embodiment may be a lithium ion battery or a lithium solid-state battery. In the case of a lithium ion secondary battery, a positive electrode, a negative electrode, and a separator are included, in addition to the electrolyte medium according to the present embodiment described above. In the case of a lithium solid-state battery, a positive electrode and a negative electrode similar to those of the lithium ion secondary battery are included, in addition to the electrolyte medium according to the embodiment including the thickener described above.

As the negative electrode, a conventionally known negative electrode used in a lithium secondary battery can be used, but preferably, lithium metal can be used. Here, as described above, to achieve high energy density, conventional studies have been made on the use of lithium metal, which is a material having the highest energy density, but it is known that, when lithium metal is used, lithium precipitates in dendrite form during charging, resulting in significant cycle degradation due to a partial short circuit, depletion of an electrolyte medium, dropout of precipitated lithium, or the like. In particular, in high-rate or large batteries, because of safety issues such as the occurrence of short-circuits, lithium metal secondary batteries have not been commonly used.

In contrast, according to the lithium secondary battery including the electrolyte medium according to the present embodiment, a short circuit can be suppressed by forming a bulky SEI layer on the surface of the negative electrode, and therefore, lithium metal can be used as the negative electrode. For the same reason, a lithium metal alloy can be also used as the negative electrode.

As the positive electrode, a conventionally known positive electrode used in a lithium secondary battery can be used. For example, lithium cobaltate or the like can be used as the positive electrode.

As the separator, a conventionally known separator used in a lithium secondary battery, for example, a microporous sheet-like polypropylene separator or the like can be used. Preferably, a separator made of a nonwoven fabric can be used. Here, as described above, to increase output, the use of a nonwoven fabric separator having a high porosity has been conventionally studied, but it is known that, in the case of using the nonwoven fabric separator, the high porosity of the nonwoven fabric separator causes a micro short circuit, making it difficult to achieve cycle stability and safety. That is, there is a trade-off between high output and short circuit suppression. In particular, it is said that it is difficult to use a nonwoven fabric separator in a lithium secondary battery using lithium metal, which is prone to a short circuit, as a negative electrode.

In contrast, according to the lithium secondary battery including the electrolyte medium of the present embodiment., short circuits can be suppressed by forming a bulky SEI layer on the surface of the negative electrode, and therefore, it is possible to use a nonwoven fabric separator, which does not have a short circuit suppressing effect because of a high porosity, instead of a conventional general raicroporous sheet-like separator (for example, a microporous sheet-like polypropylene separator) having a short circuit suppressing effect.

As the nonwoven fabric separator, for example, a cellulose-based nonwoven fabric separator or the like can be used, in addition to a polypropylene nonwoven fabric separator. The preferred porosity of the nonwoven fabric separator is 70 to 90%. When the porosity is within this range, high output can be obtained while polyvalent cation salt particles in a flowing state suppress a short circuit.

According to the lithium secondary battery of the present embodiment described above, high cycle stability (cycle retention rate of 90% or more/100 cycles) can be obtained at a high rate (about 1 C). further, according to the lithium secondary battery of the present embodiment, high cycle stability (cycle retention rate of 88% or more/200 cycles) can be obtained at a high rate (about 2 C). Therefore, according to the present embodiment, it is possible to provide a lithium secondary battery capable of suppressing short circuits and having high energy density and high output.

The electrolyte medium and the lithium secondary battery according to the present embodiment can be produced by a conventionally known production method.

The present invention is not limited to the above-described embodiments, and includes modifications and improvements within a range in which the object of the present invention can be achieved.

EXAMPLES

Examples of the present invention will be described, but the present invention is not limited to these examples.

Example 1

As the lithium secondary battery according to Example 1, a lithium secondary battery having the following configuration was produced. The lithium secondary battery according to Example 1 produced was subjected to charge/discharge tests under the following conditions.
<Configuration>
 Negative electrode: Lithium metal
 Positive electrode: Lithium cobaltate
 Separator: Polypropylene nonwoven fabric (porosity 78%)
 Electrolyte medium: 1 M $LiPF_6$/DMC+1.5 mass % MgO (average
 particle diameter: 100 μm)
<Charge/Discharge Test Conditions>
 25° C., 150 $mAhg^{-1}$-0.5 C, 100 cycles Comparative Example 1

Figure 8:
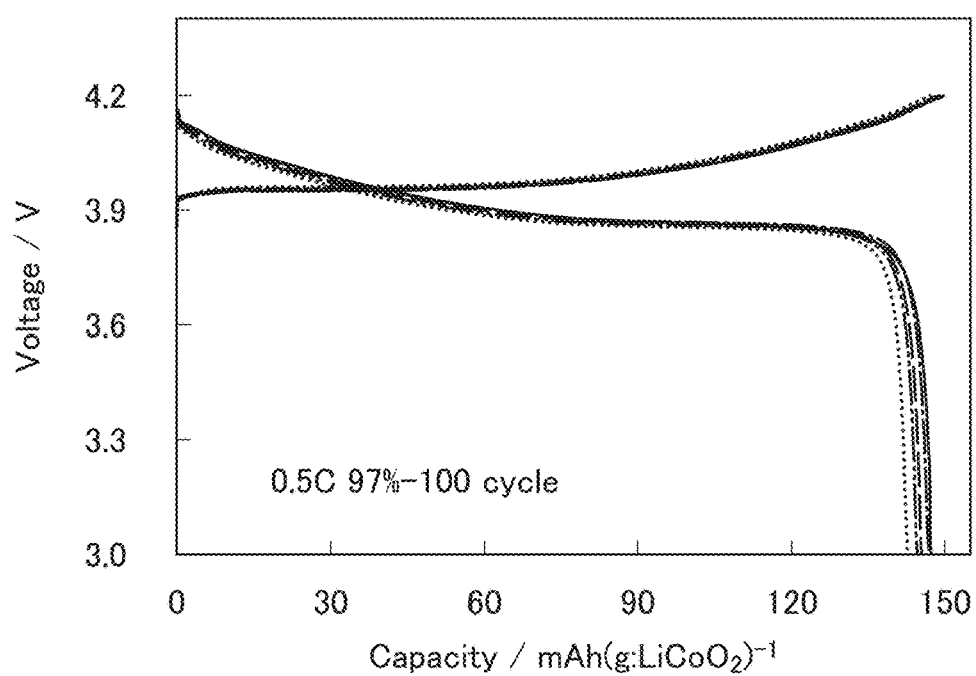
FIG. 8 is a diagram showing charge/discharge curves of a lithium secondary battery according to Example 1.
Figure 9:
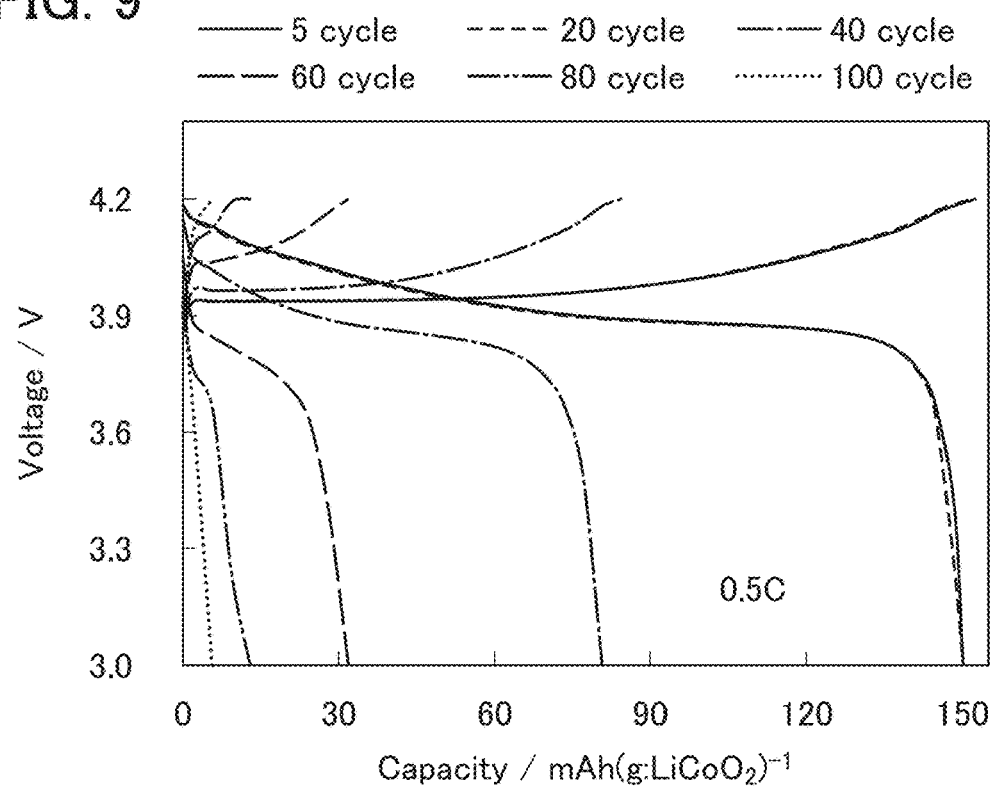
FIG. 9 is a diagram showing charge/discharge curves of a lithium secondary battery according to Comparative Example 1.

As the lithium secondary battery according to Comparative Example 1, a lithium secondary battery having the following conventional general configuration was produced. The lithium secondary battery according to Comparative Example 1 produced was subjected to charge/discharge tests under the same conditions as in Example 1.
<Configuration>
 Negative electrode: Lithium metal
 Positive electrode: Lithium cobaltate
 Separator: Kicroporous sheet-like polypropylene
 Electrolyte medium: 1 M $LiPF_6$/DMC+30 mass % EC
 FIG. 8 is a diagram showing charge/discharge curves of the lithium secondary battery according to Example 1. FIG. 9 is a diagram showing charge/discharge curves of the lithium secondary battery according to Comparative Example 1. In FIGS. 8 and 9, the horizontal axis represents capacity, and the vertical axis represents voltage (the same applies to FIGS. 10 to 28 described later). As shown in FIGS. 8 and 9, the cycle characteristics of the lithium secondary battery according to Comparative Example 1 were significantly degraded, whereas the cycle retention rate of the capacity of the lithium secondary battery according to Example 1 was 97%, which exhibited stable cycle characteristics. From these results, it was confirmed that, stable charge and discharge is possible even when lithium metal is used as a negative electrode and a nonwoven fabric separator is used as a separator, by using the electrolyte medium for a lithium secondary battery of the present invention including a low dielectric constant solvent (DMC), a lithium salt, a polyvalent cation salt (undissolved MgO in an electrolyte medium), and 20 mass % or less of a high dielectric constant solvent. Therefore, it; was confirmed that the present invention can suppress short circuits and provide high energy density and high output.

Examples 2 to 4, Comparative Example 2

As the lithium secondary batteries according to Examples 2 to 4 and Comparative Example 2, lithium secondary batteries each having the following configuration were produced. In other words, the lithium secondary batteries according to Examples 2 to 4 and Comparative Example 2 correspond to the lithium secondary battery of Example 1 described above except that EC, a high dielectric constant solvent, was added to the electrolyte medium. The content of EC in the electrolyte medium was set to 20 mass % in Example 2, 10 mass % in Example. 3, 0 mass % in Example A, and 30 mass % in Comparative Example 2. The lithium, secondary batteries of Examples 2 to 4 and Comparative Example 2 produced were subjected to charge/discharge tests under the following conditions.

Figure 10:
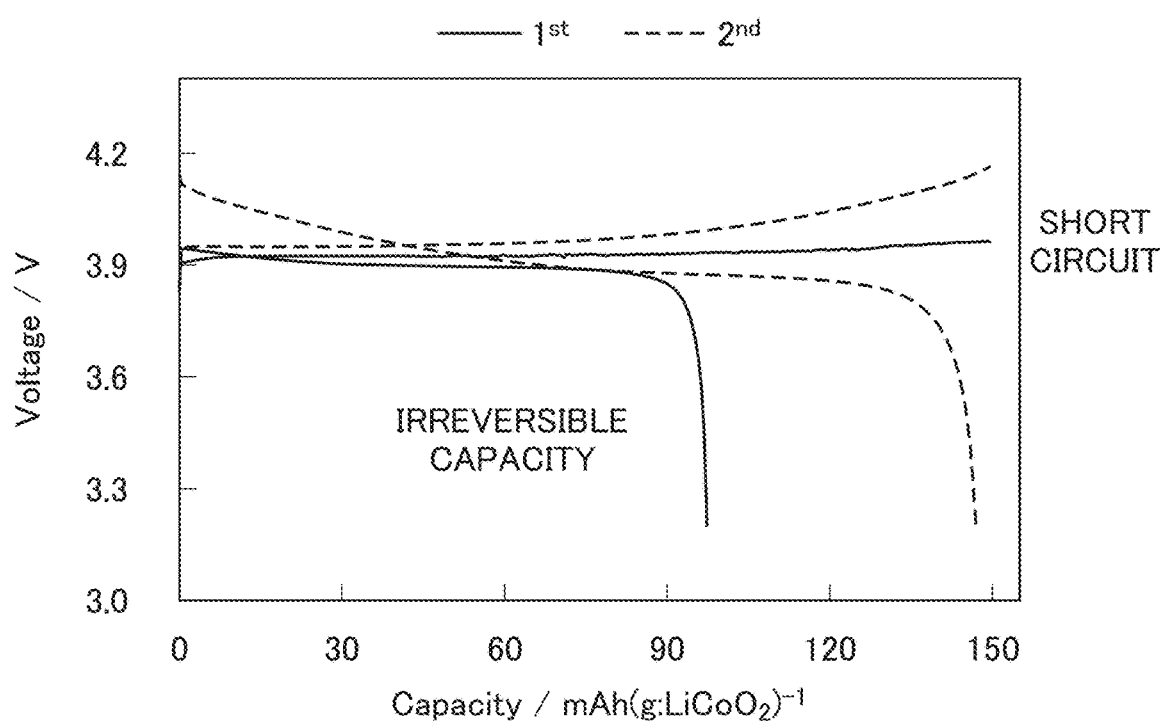
FIG. 10 is a diagram; showing charge/discharge curves of a lithium secondary battery according to Example 2.
Figure 11:
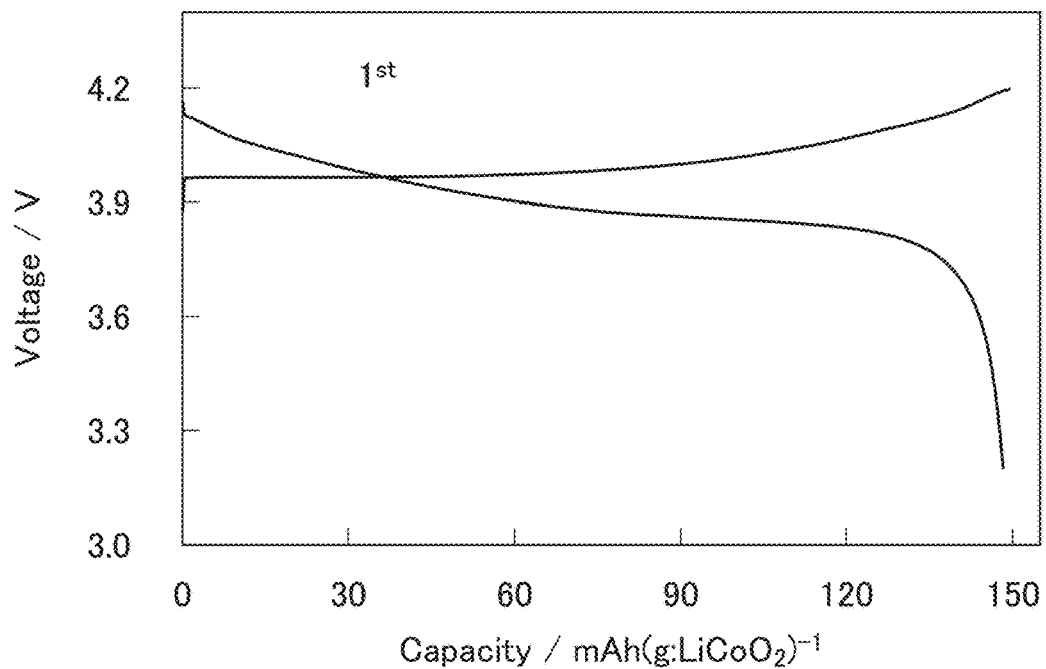
FIG. 11 is a diagram showing charge/discharge curves of a lithium secondary battery according to Example 3.
Figure 12:
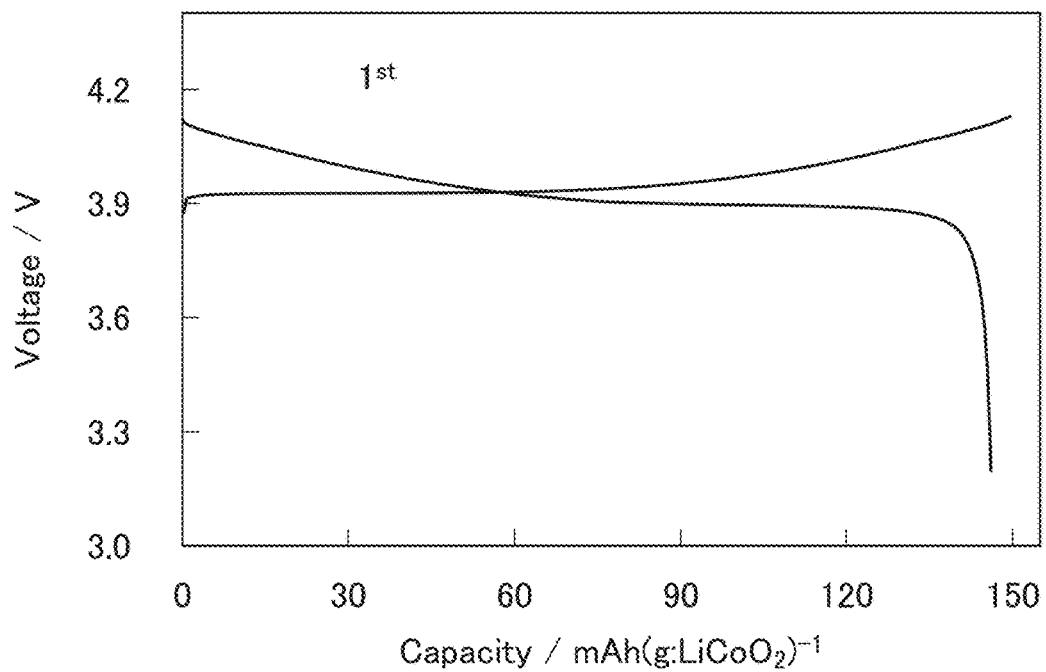
FIG. 12 is a diagram showing charge/discharge curves of a lithium secondary battery according to Example 4.
Figure 13:
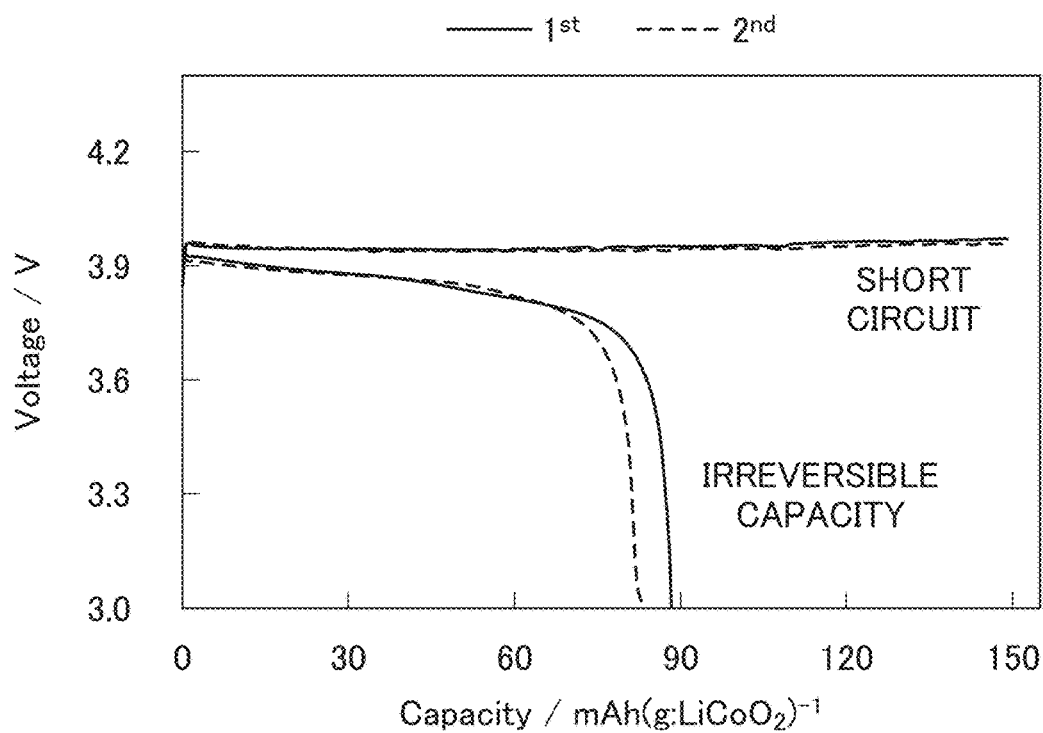
FIG. 13 is a diagram showing charge/discharge curves of a lithium secondary battery according to Comparative Example 2.

<Configuration>
Negative electrode: Lithium metal
Positive electrode: lithium cobaltate
Separator: Polypropylene nonwoven fabric (porosity 78%)
Electrolyte medium: 1.2 M LIPFe/DMC+0.1 mass % MgO (average particle diameter: 100 μm)+0 to 30 mass % EC
<Charge/Discharge Test Conditions>25° C., 150 mAhg$^{-1}$-0.2 C FIG. 10 is a diagram showing charge/discharge curves of the lithium secondary battery according to Example 2. FIG. 11 is a diagram showing charge/discharge curves of the lithium secondary battery according to Example 3. FIG. 12 is a diagram showing charge/discharge curves of the lithium secondary battery according to Example 4. FIG. 13 is a diagram showing charge/discharge curves of the lithium secondary battery according to Comparative Example 2. FIGS. 10 to 13 all show initial charge/discharge curves. As shown in FIGS. 11 to 13, it was confirmed that no short circuit occurred in the lithium secondary batteries of Examples 3 and 4 in which the content of EC as the high dielectric constant solvent in the electrolyte medium was 20 mass % or less, whereas a short circuit occurred in the lithium secondary battery of Comparative Example 2 in which the content of EC as the high dielectric constant solvent in the electrolyte medium was 30 mass %. As shown in FIG. 10, it was confirmed that, in the lithium secondary battery of Example 2 in which the content of EC as the high dielectric constant solvent in the electrolyte medium was 20 mass % or less, a short circuit occurred in the first cycle, but it was restored in the second cycle. It was presumed that this was because the layer was reconstructed by charging and discharging. From these results, it was confirmed that, according to the present invention, when the content of the high dielectric constant solvent in the electrolyte medium is 20 mass % or less, a short circuit can be suppressed and high energy density and high output can be obtained. In particular, it was also confirmed that the charge/discharge characteristics of the lithium secondary battery of Example 4, in which a high dielectric constant solvent is not included in the electrolyte medium, are preferable.

Examples 5 to 6, Comparative Examples 3 to 4

As the lithium secondary batteries according to Examples 5 and 6 and Comparative Examples 3 and 4, lithium secondary batteries each having the following configuration were produced. In other words, the lithium secondary batteries according to Examples 5 and 6 and Comparative Examples 3 and 4 correspond to the lithium secondary battery of Example 1 described above except that the polyvalent cation salt added to the electrolyte medium was changed to Mg(TFS)$_2$. The content, of Mg(TFS)$_2$ in the electrolyte medium was set to 2.0 mass % in Example 5, 3.0 mass % in Example 6, 0.5 mass % in Comparative Example 3, and 1.0 mass % in Comparative Example 4. In Comparative Examples 3 and 4, Mg(TFS)$_2$ was heated and dissolved in the electrolyte medium, whereas in Examples 5 and 6, Mg(TFS)$_2$ was suspended in the electrolyte medium without heating. Mg(TFS)$_2$ was dispersed in particulate form as (MgPF$_6$)$_2$ when left to stand, and its average particle diameter was nano-sized. The lithium secondary batteries of Examples 5 and 6 and Comparative Examples 3 and 4 were subjected to charge/discharge tests under the following conditions.

Figure 14:
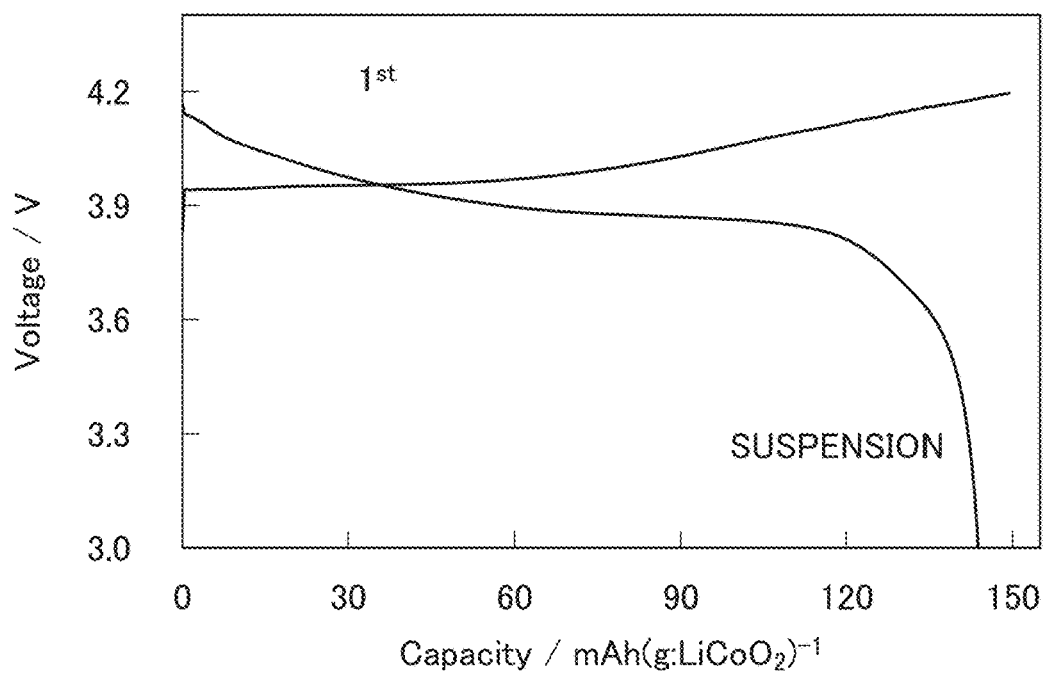
FIG. 14 is a diagram showing charge/discharge curves of a lithium secondary battery according to Example 5.
Figure 15:
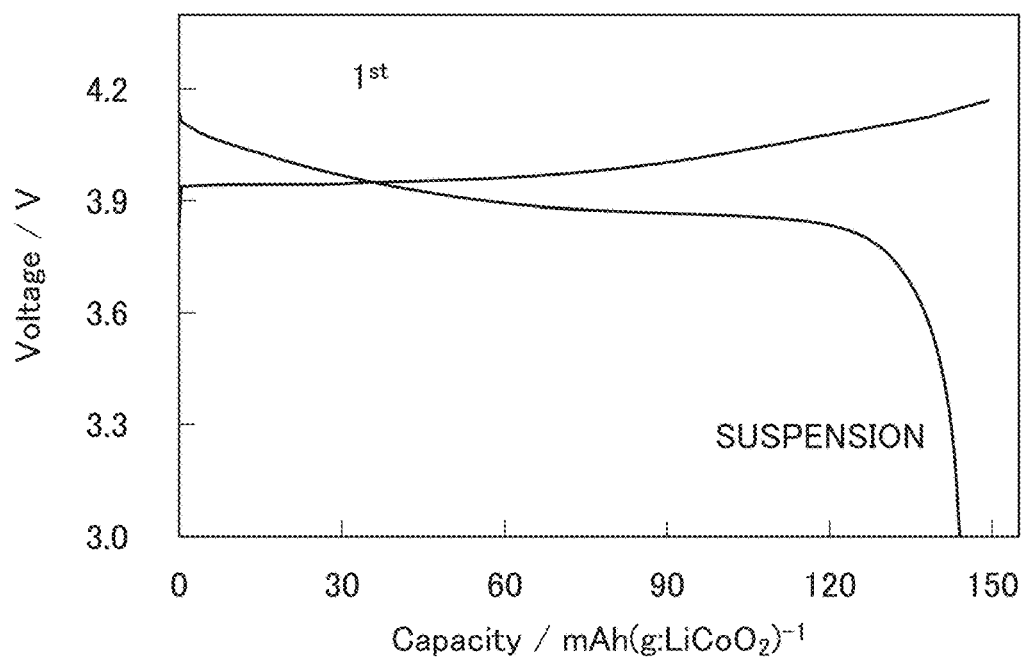
FIG. 15 is a diagram showing charge/discharge curves of a lithium secondary battery according to Example 6.
Figure 16:
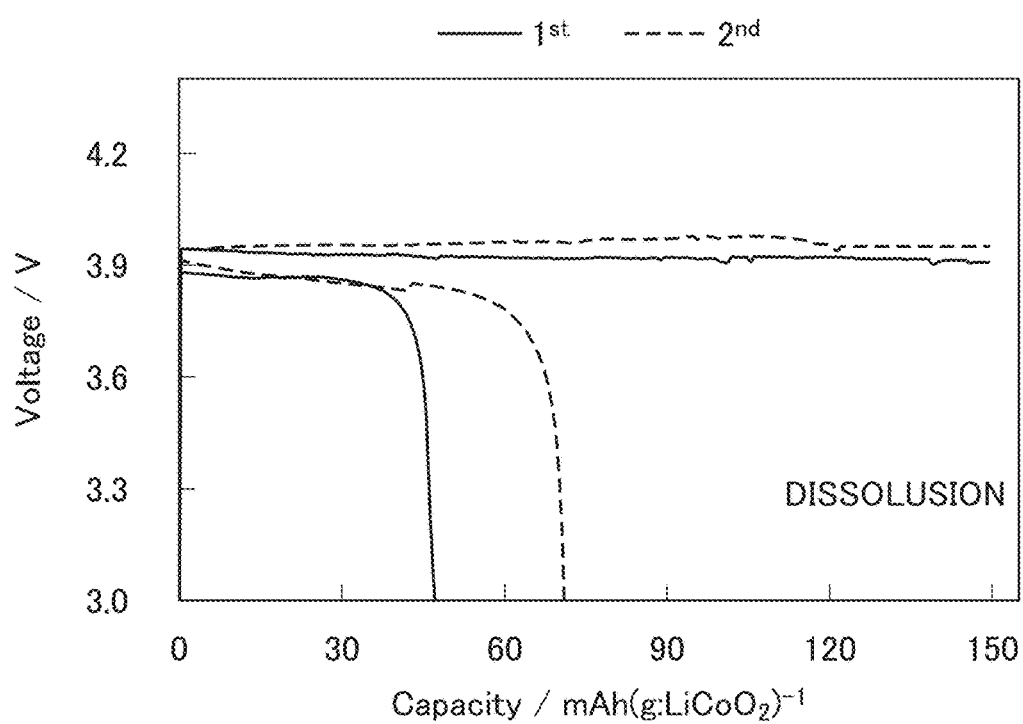
FIG. 16 is a diagram showing charge/discharge curves of a lithium secondary battery according to Comparative Example 3.
Figure 17:
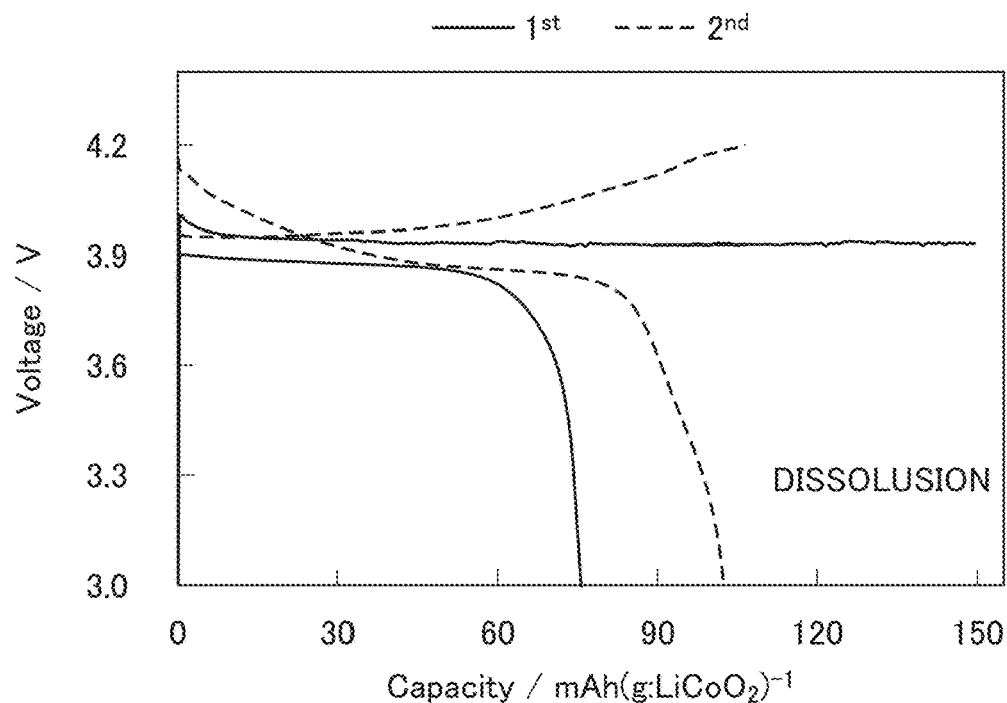
FIG. 17 is a diagram showing charge/discharge curves of a lithium secondary battery according to Comparative Example 4.

<Configuration>
Negative electrode: Lithium metal
Positive electrode: Lithium cobaltate
Separator: Polypropylene nonwoven fabric (porosity 78%)
Electrolyte medium: 1.0 M LiPF$_6$/DMC+0.5 to 3.0 mass % Mg(TFS)st
<Charge/Discharge Test Conditions>
50° C., 150 mAhg$^{-1}$-0.2 C FIG. 14 is a diagram showing charge/discharge curves of the lithium secondary battery according to Example 5. FIG. 15 is a diagram showing charge/discharge curves of the lithium secondary battery according to Example 6. FIG. 16 is a diagram showing charge/discharge curves of the lithium secondary battery according to Comparative Example 3. FIG. 17 is a diagram showing charge/discharge curves of the lithium secondary battery according to Comparative Example 4. FIGS. 14 to 17 all show initial charge/discharge curves. As shown in FIGS. 14 to 17, in the lithium secondary batteries of Examples 5 and 6 in which Mg (TFS)$_2$ as the polyvalent, cation salt in the electrolyte medium was undissoived and suspended, stable charge and discharge characteristics were obtained without short circuit/ whereas in the lithium secondary batteries of Comparative Examples 3 and 4 in which Mg(TFS)$_2$ as the polyvalent cation salt in the electrolyte medium was dissolved, stable charge and discharge characteristics were not obtained. From these results. It was confirmed that, according to the present invention, since the polyvalent cation salt in the electrolyte medium is undissolved, a short circuit can be suppressed and high energy density and high output can be obtained.

Examples 7 to 9

Figure 18:
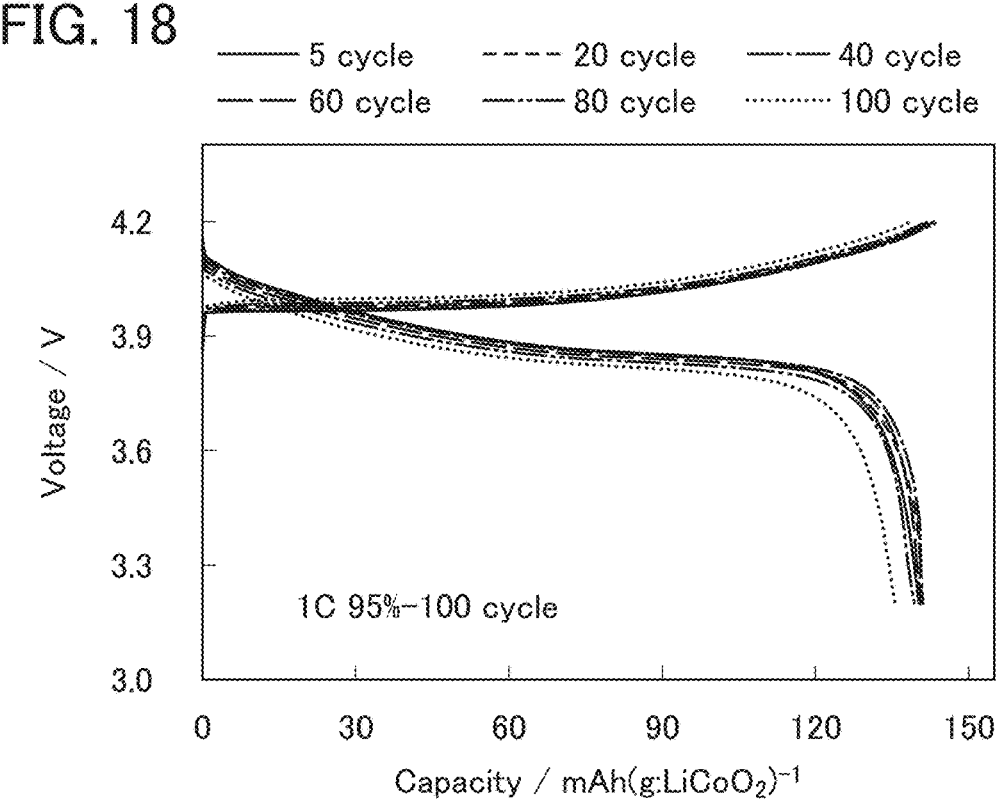
FIG. 18 is a diagram showing charge/discharge curves of a lithium secondary battery according to Example 7.
Figure 19:
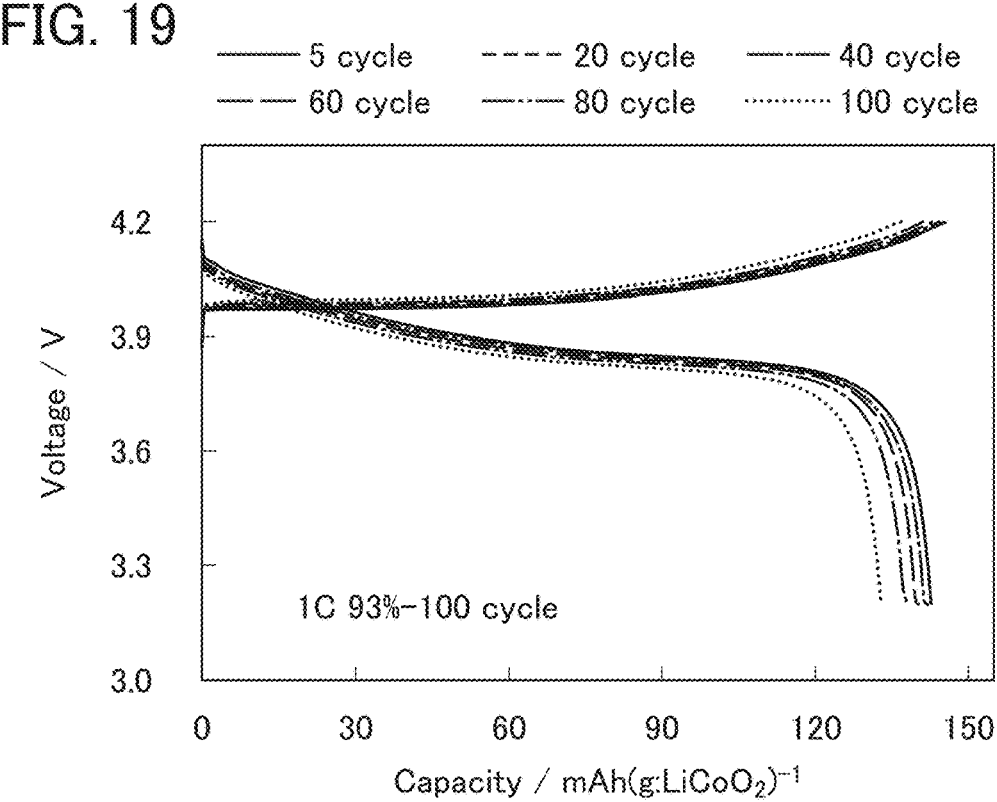
FIG. 19 is a diagram showing charge/discharge curves of a lithium secondary battery according to Example 8.
Figure 20:
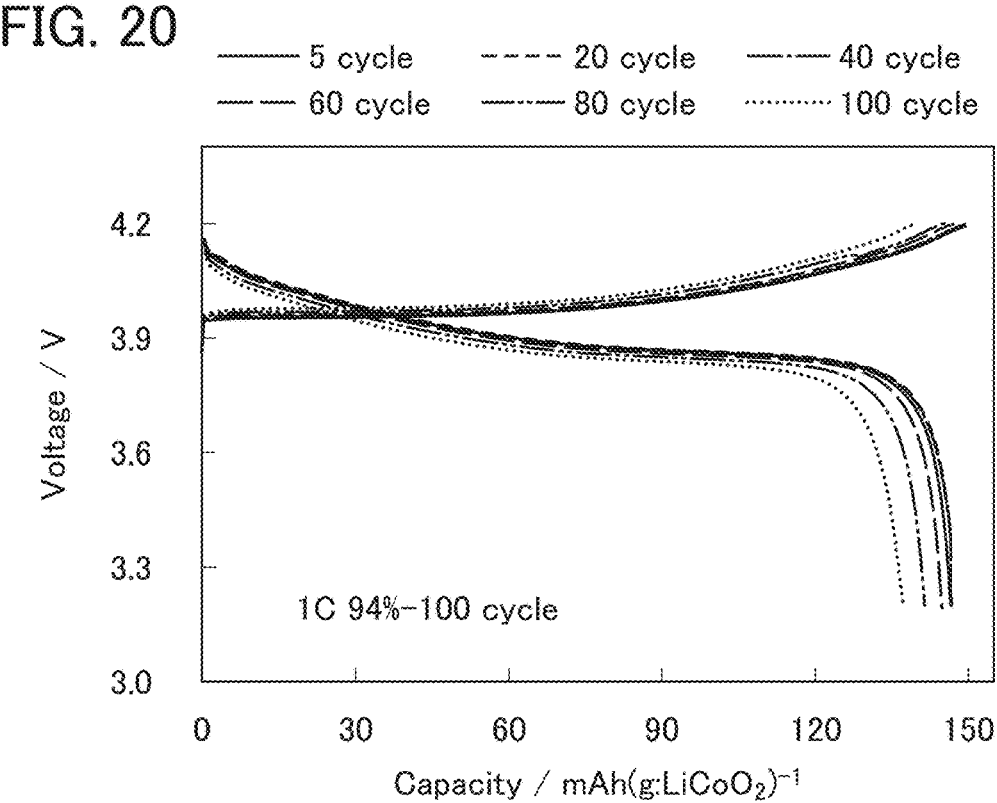
FIG. 20 is a diagram showing charge/discharge curves of a lithium secondary battery according to Example 9.

As the lithium secondary batteries according to Examples 7 to 9, lithium secondary batteries each having the following configuration were produced. In other words, the lithium secondary batteries according to Examples 7 to 9 correspond to the lithium secondary battery of Example 1 described above except that the polyvalent cation salt added to the electrolyte medium was changed to MgO in Example 1, Mg(TFS)$_2$ in Example 8, and Mg(TFSI)$_2$ in Example 9. These examples each use a magnesium salt having an average particle diameter of 40 μm and a different type of anion. In each of Examples 7 to 9, the content of the polyvalent cation salt in the electrolyte medium was set to 0.1 mass %, and the polyvalent cation salt was undissolved and suspended in the electrolyte medium. Mg(TFS)$_2$ and Mg(TFSI)$_2$ were dispersed in particulate form as (MgPF$_6$)$_2$ when left to stand, and its average particle diameter was nano-sized. The lithium secondary batteries according to Examples 7 to 3 produced were subjected to charge/discharge tests under the following conditions.
<Configuration>
Negative electrode: Lithium metal
Positive electrode: Lithium cobaltate
Separator: Polypropylene nonwoven fabric (porosity 78%)
Electrolyte medium: 1.2 M LiPF$_4$/DMC+0.1 mass % (MgO, Mg(TFS) Mg(TFSI)$_2$)
<Charge/Discharge Test Conditions>
25° C., 150 mAhg$^{-1}$-1 C, 100 cycles FIG. 18 is a diagram showing charge/discharge curves of the lithium secondary battery according to Example 7. FIG. 19 is a diagram showing charge/discharge curves of the lithium secondary battery according to Example 8. FIG. 20 is a diagram showing charge/discharge curves of the lithium secondary battery according to Example 9. As shown in FIGS. 18 to 20, in the lithium secondary batteries of Examples 7 to 9 in which the polyvalent cation salt in the electrolyte medium was undissolved and suspended, the cycle retention rate of the capacity was 95% in Example 7, 93% in Example 3, and 94% in Example 9, and it was confirmed that stable cycle characteristics and charge/discharge characteristics are obtained. From these results, according to the present invention, it was confirmed that, if the polyvalent cation salt in the electrolyte medium is undissoived, a short circuit can be suppressed regardless of the type of anion, and high energy density and high output can be obtained.

Examples 10 to 12

Figure 21:
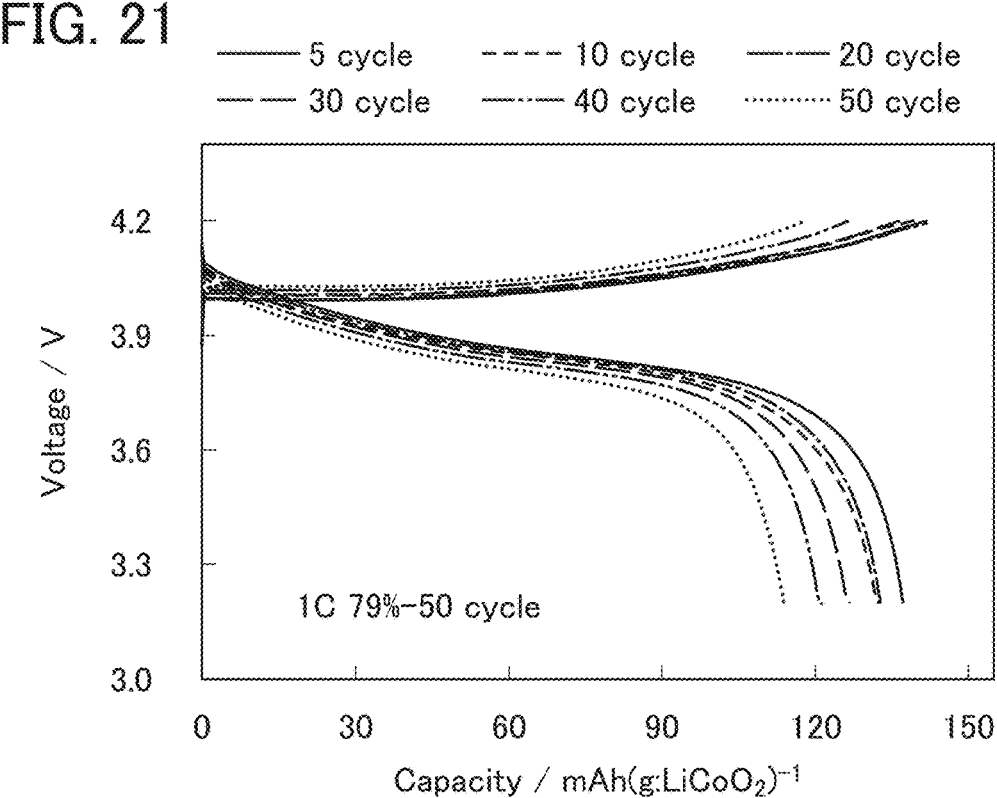
FIG. 21 is a diagram showing a charge/discharge curve of a lithium secondary battery according to Example 10.
Figure 22:
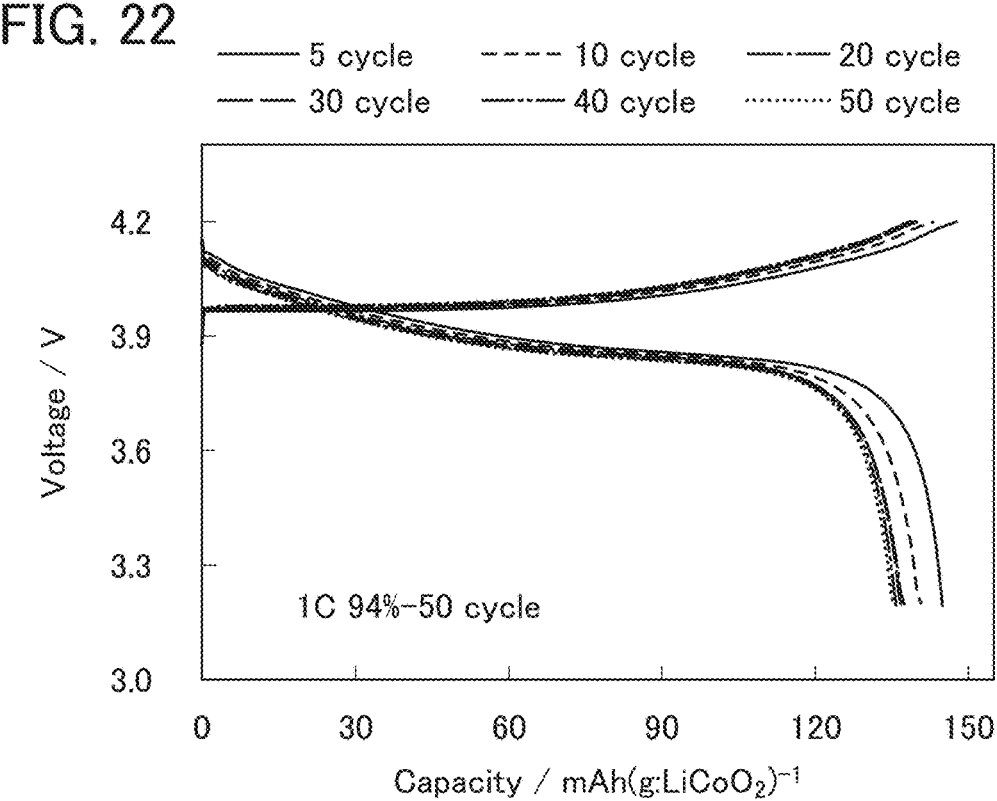
FIG. 22 is a diagram showing charge/discharge curves of a lithium secondary battery according to Example 11.
Figure 23:
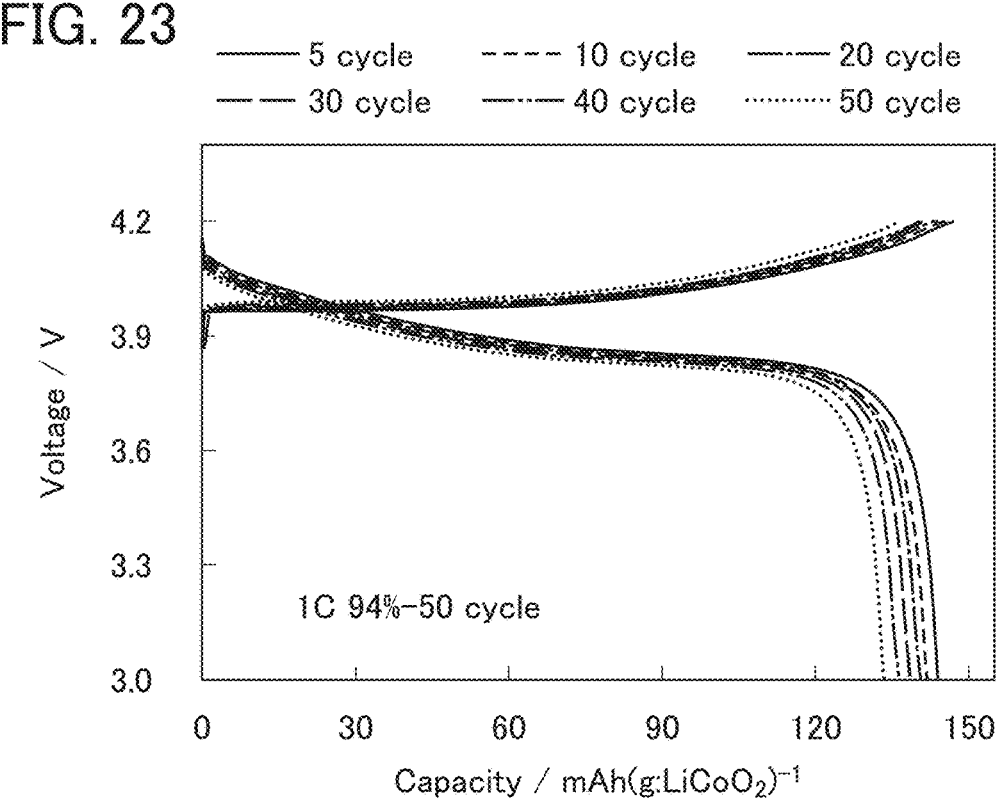
FIG. 23 is a diagram showing charge/discharge curves of a lithium secondary battery according to Example 12.

As the lithium secondary batteries according to Examples 10 to 12, lithium secondary batteries each having the following configuration were produced. In other words, the lithium secondary batteries according to Examples 10 to 12 correspond to the lithium secondary battery of Example 1 described above except that the polyvalent cation salt added to the electrolyte medium was changed to CaO having an average particle diameter of 100 μm in Example 10, CaO having an average particle diameter of 20 μm in Example 11, and CaO having an average particle diameter of 1 μm in Example 12. These examples each use CaO having a different average particle diameter. In each of Examples 10 to 12, the content of the polyvalent cation salt in the electrolyte medium was set to 0.1 mass %, and the polyvalent cation salt was undissoived and suspended in the electrolyte medium. The lithium secondary batteries according to Examples 10 to 12 produced were subjected to charge/discharge tests under the following conditions.
<Configuration>
  Negative electrode: Lithium metal
  Positive electrode: Lithium cobaltate
  Separator: Polypropylene nonwoven fabric (porosity 78%)
  Electrolyte medium: 1.2 M LiPFc/DMC+0.1 mass % CaO (average
    particle diameter 1 to 100 μm)
<Charge/Discharge Test Conditions>
  25° C., 150 mAhg$^{-1}$ -1 C, 50 cycles FIG. 21 is a diagram showing charge/discharge curves of the lithium secondary battery according to Example 20. FIG. 22 is a diagram showing charge/discharge curves of the lithium secondary battery according to Example 11. FIG. 23 is a diagram showing charge/discharge curves of the lithium secondary battery according to Example 12. As shown in FIGS. 21 to 23, it was confirmed that a short circuit can be suppressed, and high energy density and high output can be obtained, regardless of the average particle diameter of the polyvalent cation salt in the electrolyte medium. In particular, as shown in FIG. 21, in the lithium secondary battery according to Example 10 in which the average particle diameter of the polyvalent cation salt is 100 μm, since the average particle diameter of the polyvalent cation salt is large, variation in capacity between cycles is slightly observed. Thus, it was confirmed that the average particle diameter of the polyvalent cation salt in the electrolyte medium is preferably 1 to 100 μm.

Examples 23 to 15, Comparative Example 5

Figure 24:
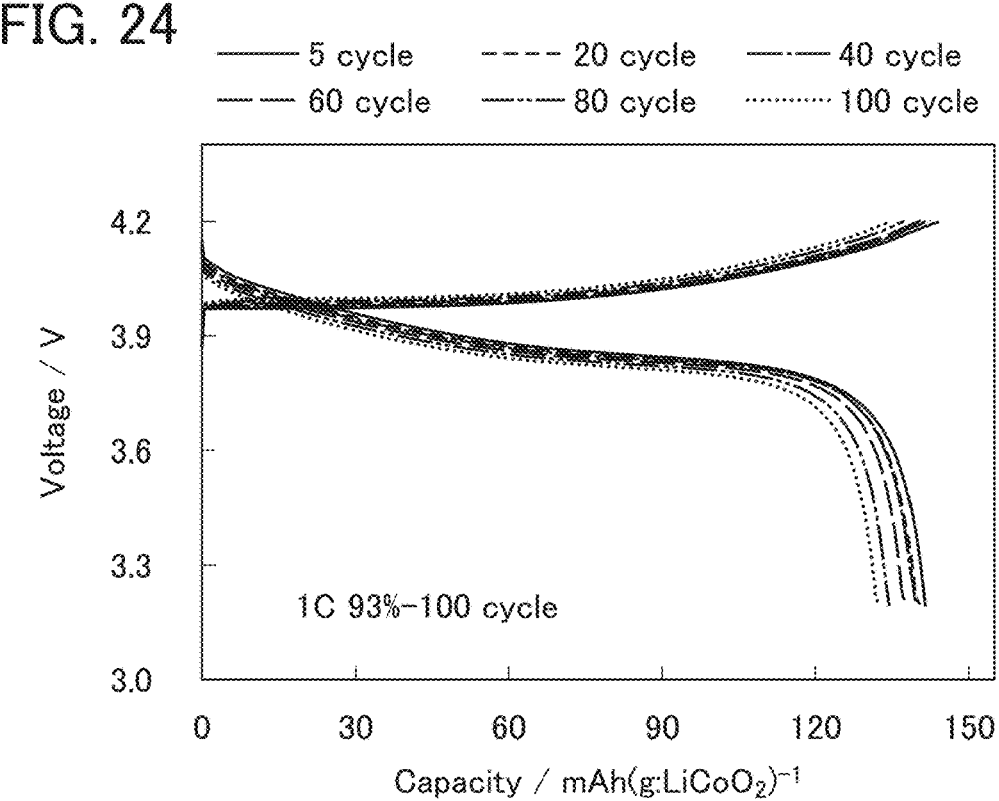
FIG. 24 is a diagram showing charge/discharge curves of a lithium secondary battery according to Example 13.
Figure 25:
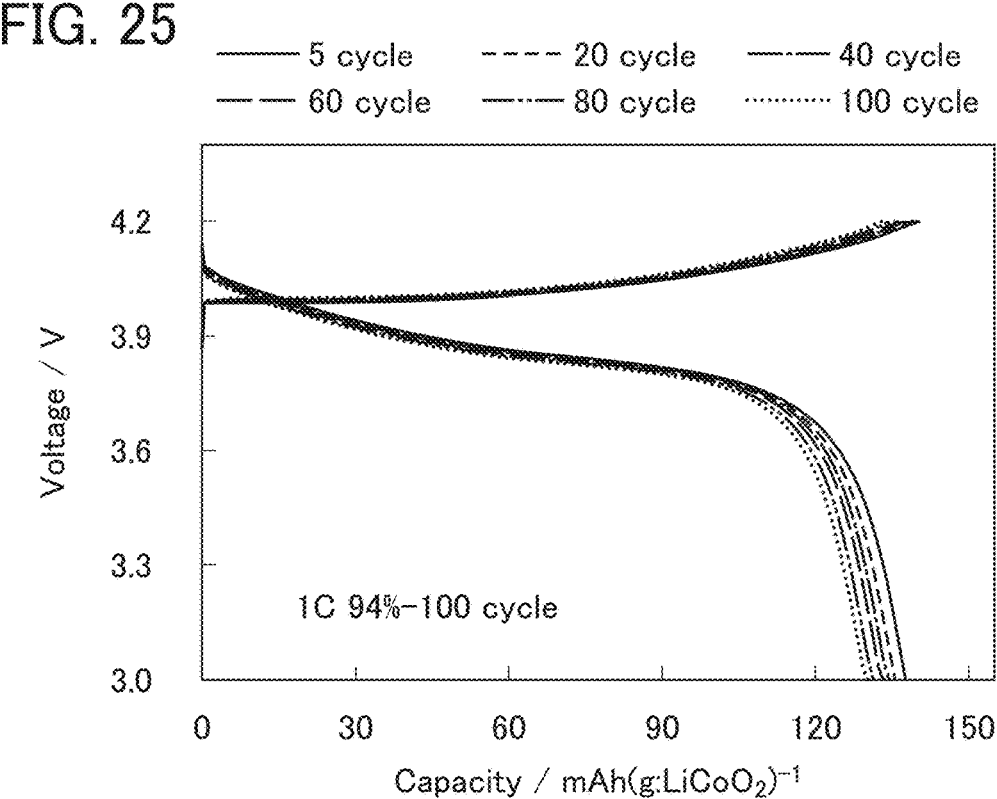
FIG. 25 is a diagram showing charge/discharge curves of a lithium secondary battery according to Example 14.
Figure 26:
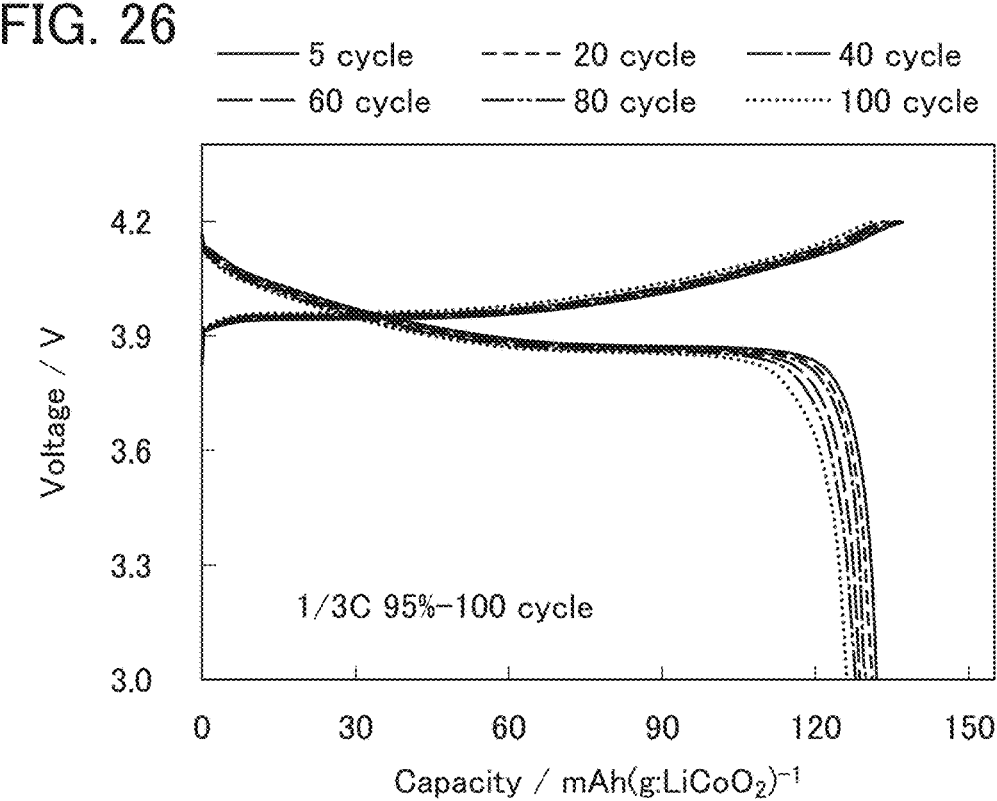
FIG. 26 is a diagram showing charge/discharge curves of a lithium secondary battery according to Example 15.

As the lithium secondary batteries according to Examples 13 to 15 and Comparative Example 5, lithium secondary batteries each having the following configuration were produced. In other words, the lithium secondary batteries according to Examples 13 to 15 and Comparative Example 5 were obtained by changing the polyvalent cation salt added to the electrolyte medium to Al$_2$O$_3$ compared to the lithium secondary battery of Example 1 described above, and setting the content of Al$_2$O$_3$ to 0.1 mass % in Example 13, 1.5 mass % in Example 14, 50 mass % in Example 15, and 0.05 mass % in Comparative Example 5 (however, in Example 15, a separator was not used and the electrolyte medium was a granular solid as described later, which are also differences from Example 1). The lithium secondary batteries according to Examples 13 to 15 produced were subjected to charge/discharge tests under the following conditions.
<Configuration (Examples 13 and 14, Comparative Example 5)>
  Negative electrode: Lithium metal
  Positive electrode: Lithium cobaltate
  Separator: Polypropylene nonwoven fabric (porosity 78%)
  Electrolyte medium: 1.2 M LiPFe/OMC+0.05 to 1.5 mass % αAl$_2$O$_3$ (average particle diameter 20 μm)
<Charge/Discharge Test Conditions (Examples 13 and 14)>
  25° C., 150 mAhg$^{-1}$-1 C, 100 cycles
<Configuration (Example 15)>
  Negative electrode: Lithium metal
  Positive electrode: Lithium cobaltate
  Separator: Hone
  Electrolyte medium (granular solid): 1.8 M LiPF$_6$/DMC+ 50 mass %
    αAl$_2$O$_3$ (average particle diameter 20 μm)
<Charge/Discharge Test Conditions (Example 15)>
  25° C., 150 mAhg$^{-1}$-1/3 C, 100 cycles FIG. 25 is a diagram showing charge/discharge curves of the lithium secondary battery according to Example 13. FIG. 25 is a diagram showing charge/discharge curves of the lithium secondary battery according to Example 14. FIG. 26 is a diagram showing charge/discharge curves of the lithium secondary battery according to Example 15. As shown in FIGS. 24 to 26, it was confirmed that, in each of the examples, a high cycle retention rate was obtained regardless of the content of the polyvalent cation salt in the electrolyte medium, so that a short circuit can be suppressed and high energy density and high output can be obtained. In the lithium secondary battery according to Comparative Example 5, since the content of the polyvalent cation salt in the electrolyte medium was as small as 0.05 mass %, the formation of a bulky SEI layer was incomplete, and a short circuit occurred. Therefore, it was confirmed that, when the content of the polyvalent cation salt in the electrolyte medium is 0.1 mass % or more, the lithium metal of the negative electrode is covered with a bulky SEI layer, and thus stable charge and discharge characteristics can be obtained. However, in the lithium secondary battery according to Example 15, it can be seen that, since the content of the polyvalent cation salt in the electrolyte medium is very high, it became a granular solid impregnated with the electrolyte medium, and thus the rate characteristics decrease. Therefore, it was confirmed that, the content of the polyvalent cation salt in the electrolyte medium is preferably 0.1 to 50 mass %, and more preferably 0.1 to 1.5 mass %.

Example 16, Comparative Example 6

As the lithium secondary batteries according to Example 16 and Comparative Example 6, lithium secondary batteries each having the following configuration were produced. In other words, the lithium secondary battery according to Example 16 corresponds to the lithium secondary battery of Example 1 described above except that the content of the polyvalent cation salt, MgO added to the electrolyte medium was changed to 0.1 mass %. The lithium secondary battery according to Comparative Example 6 has the same configuration as that of the lithium secondary battery according to Comparative Example 1 described above. The lithium secondary batteries of Example 16 and Comparative Example 6 produced were subjected to charge/discharge tests under the following conditions.

Figure 27:
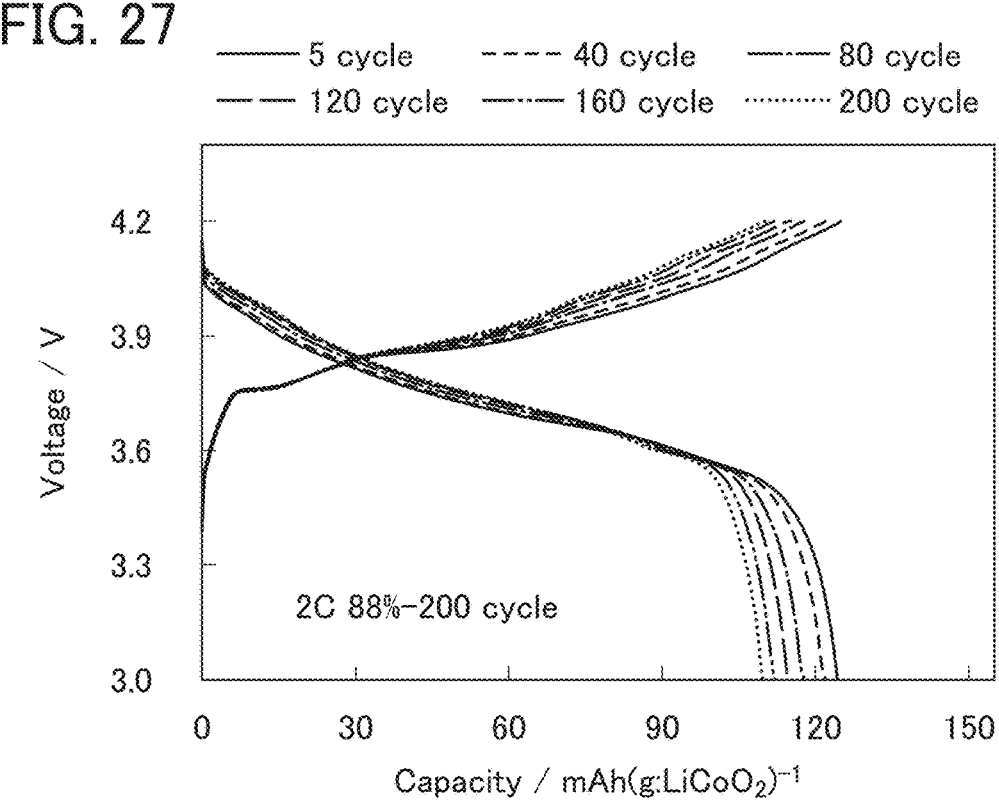
FIG. 27 is a diagram showing charge/discharge curves of a lithium secondary battery according to Example 16.
Figure 28:
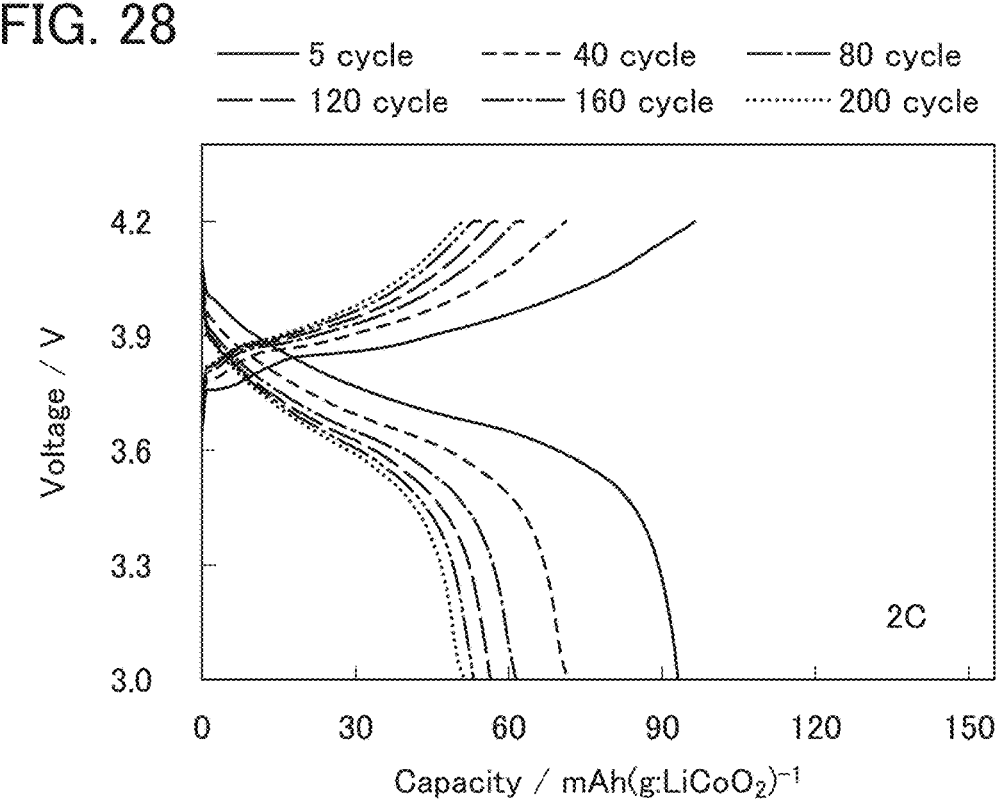
FIG. 28 is a diagram showing charge/discharge curves or a lithium secondary battery according to Comparative Example 6.

<Configuration (Example 16)>
  Negative electrode: Lithium metal
  Positive electrode: Lithium cobaitate
  Separator: Polypropylene nonwoven fabric (porosity 78%)
  Electrolyte medium: 1 M LiPFe/DMC+1.5 mass % MgO
<Charge/Discharge Test Conditions>
  25° C., 150 mAhg$^{-1}$-2 C, 200 cycles
<Configuration (Comparative Example 6)>
  Negative electrode: Lithium metal
  Positive electrode: Lithium cobaltate
  Separator: Microporous sheet-like polypropylene
  Electrolyte medium: 1 M LiPF$_6$/DMC+30 mass % EC
<Charge/Discharge Test Conditions>
  25° C., 150 mAhg$^{-1}$-2 C, 200 cycles FIG. 27 is a diagram showing charge/discharge curves of the lithium secondary battery according to Example 16. FIG. 28 is a diagram showing charge/discharge curves of the lithium secondary battery according to Comparative Example 6. As shown in FIGS. 27 and 28, the lithium secondary battery according to Example 16 was capable of high-rate (2 C) charging and discharging, whereas the lithium secondary battery according to Comparative Example 6 exhibited cycle degradation in high-rate (2 C) charging and discharging. From these results, it was confirmed that the present invention is capable of high rate (2 C) charging and discharging.

EXPLANATION OF REFERENCE NUMERALS 1, 2, 3, 4 electrolyte medium
10, 20/ 30/ 40 lithium secondary battery
11, 21, 31, 41 polyvalent cation salt particles
12, 22, 32, 42 electrolytic solution layer
13 electrolytic solution
43 electrolyte gel layer
91 positive electrode
92 negative electrode
93 separator
94 solid electrolyte
95 electrolyte gel

What is claimed is:

1. An electrolyte medium for a lithium secondary battery, the electrolyte medium comprising:
   an electrolytic solution; and
   a polyvalent cation salt,
   the electrolytic solution comprising a low dielectric constant solvent having a dielectric constant of less than 10 and a lithium salt,
   the polyvalent cation salt being in a state in which particles of the polyvalent cation salt are dispersed in the electrolytic solution and can flow without being immobilized,
   the polyvalent cation salt having a content of 0.1 mass % to 50 mass %, and
   the electrolytic solution not comprising a high dielectric constant solvent having a dielectric constant of greater than 50 or comprising the high dielectric constant solvent at a content of 20 mass % or less with respect to the total mass of the electrolyte medium.

2. The electrolyte medium for a lithium secondary battery according to claim 1, wherein the polyvalent cation salt, is at least one selected from the group consisting of magnesium trifluoromethanesulfonate, magnesium oxide, magnesium bis(trifluoromethanesulfonyl)imide, calcium trifluoromethanesulfonate, calcium oxide, calcium bis(trifluoromethanesulfonyl)imide, aluminum trifluoromethanesulfonate, and aluminum oxide.

3. The electrolyte medium for a lithium secondary battery according to claim 1, wherein a particle diameter of the polyvalent cation salt is 100 µm or less.

4. The electrolyte medium for a lithium secondary battery according to claim 1, comprising a thickener.

5. A lithium secondary battery, comprising the electrolyte medium for a lithium secondary battery according to claim 1.

6. The lithium secondary battery according to claim 5, comprising a separator made of a nonwoven fabric.

7. The lithium secondary battery according to claim 5, wherein the lithium secondary battery comprises a negative electrode composed of lithium metal or a lithium metal alloy.

* * * * *